US012551426B2

(12) United States Patent
Weser et al.

(10) Patent No.: US 12,551,426 B2
(45) Date of Patent: Feb. 17, 2026

(54) METHOD FOR TREATING HAIR, COMPRISING THE APPLICATION OF A FIRST AGENT (a) HAVING A SILANE AND A CHROMOPHORIC COMPOUND, AND A SECOND AGENT (b) HAVING A FILM-FORMING POLYMER

(71) Applicant: Henkel AG & Co. KGaA, Duesseldorf (DE)

(72) Inventors: Gabriele Weser, Neuss (DE); Claudia Kolonko, Remscheid (DE); Ulrike Schumacher, Duesseldorf (DE); Caroline Kriener, Duesseldorf (DE); Juergen Schoepgens, Schwalmtal (DE); Torsten Lechner, Langenfeld (DE); Marc Nowottny, Moenchengladbach (DE); Carsten Mathiaszyk, Essen (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 892 days.

(21) Appl. No.: 17/290,735

(22) PCT Filed: Aug. 12, 2019

(86) PCT No.: PCT/EP2019/071623

§ 371 (c)(1),
(2) Date: Apr. 30, 2021

(87) PCT Pub. No.: WO2020/088813

PCT Pub. Date: May 7, 2020

(65) Prior Publication Data

US 2022/0000749 A1 Jan. 6, 2022

(30) Foreign Application Priority Data

Oct. 31, 2018 (DE) ..................... 10 2018 218 634.0

(51) Int. Cl.

| | |
|---|---|
| ***A61K 8/58*** | (2006.01) |
| ***A61K 8/81*** | (2006.01) |
| ***A61K 8/894*** | (2006.01) |
| ***A61K 8/898*** | (2006.01) |
| ***A61Q 5/10*** | (2006.01) |

(52) U.S. Cl.

CPC ............ *A61K 8/585* (2013.01); *A61K 8/8147* (2013.01); *A61K 8/894* (2013.01); *A61K 8/898* (2013.01); *A61Q 5/10* (2013.01); *A61K 2800/432* (2013.01); *A61K 2800/88* (2013.01); *A61K 2800/95* (2013.01)

(58) Field of Classification Search

None

See application file for complete search history.

(56) References Cited

U.S. PATENT DOCUMENTS

| | | | | |
|---|---|---|---|---|
| 10,034,829 | B2 | 7/2018 | Dempsey et al. | |
| 2006/0265818 | A1* | 11/2006 | Seiler | A61Q 5/08 8/412 |
| 2009/0081146 | A1* | 3/2009 | Fukuhara | A61K 8/4913 424/70.1 |
| 2010/0083446 | A1 | 4/2010 | Brun et al. | |
| 2015/0080338 | A1* | 3/2015 | Lorant | A61K 8/8152 514/63 |

FOREIGN PATENT DOCUMENTS

| | | | |
|---|---|---|---|
| CN | 101791278 | A | 8/2010 |
| CN | 104244913 | A | 12/2014 |
| EP | 2168633 | A2 | 3/2010 |
| JP | 2010083892 | A | 4/2010 |
| JP | 2013540815 | A | 11/2013 |
| WO | 2013160363 | A2 | 10/2013 |
| WO | 2018185345 | A1 | 10/2018 |

OTHER PUBLICATIONS

Happi, EcoSmooth Satin from Dow Chemical, https://www.happi.com/contents/view_breaking-news/2011-05-31/ecosmooth-satin-from-dow-chemical/ May 31, 2011 (Year: 2011).*

* cited by examiner

*Primary Examiner* — Jennifer A Berrios

(74) *Attorney, Agent, or Firm* — Ingrassia Fisher & Lorenz, LLP

(57) ABSTRACT

The subject of the present disclosure is a process for dyeing keratinous material, in particular human hair, comprising the following steps:

Application of an agent (a) to the keratinous material, wherein the agent (a) comprises:

(a1) at least one organic silicon compound selected from the group of silanes having one, two or three silicon atoms, and (a2) at least one colorant compound selected from the group of pigments and/or direct dyes, and Application of an agent (b) to the keratinous material, wherein the agent (b) comprises:

(b1) at least one film-forming polymer.

15 Claims, No Drawings

METHOD FOR TREATING HAIR, COMPRISING THE APPLICATION OF A FIRST AGENT (a) HAVING A SILANE AND A CHROMOPHORIC COMPOUND, AND A SECOND AGENT (b) HAVING A FILM-FORMING POLYMER

CROSS-REFERENCE TO RELATED APPLICATION

This application is a U.S. National-Stage entry under 35 U.S.C. § 371 based on International Application No. PCT/EP2019/071623, filed Aug. 12, 2019, which was published under PCT Article 21(2) and which claims priority to German Application No. 10 2018 218 634.0, filed Oct. 31, 2018, which are all hereby incorporated in their entirety by reference.

TECHNICAL FIELD

The subject of the present application is a method for treating keratinous material, in particular human hair, which comprises the application of two agents (a) and (b). The agent (a) is exemplified by its content of at least one organic silicon compound (a1) and at least one coloring compound (a2). The agent (b) contains at least one film-forming polymer.

A further subject of this application is a multi-component packaging unit (kit-of-parts) for dyeing keratinous material, in particular human hair, which comprises separately prepared at least three agents (a'), (a") and (b). Agents (a') and (a") can be used to prepare the agent (a) used in the process described above.

BACKGROUND

The change in shape and color of keratin fibers, especially hair, is an important area of modern cosmetics. To change the hair color, the expert knows various coloring systems depending on coloring requirements. Oxidation dyes are usually used for permanent, intensive dyeing's with good fastness properties and good grey coverage. Such dyes usually contain oxidation dye precursors, so-called developer components and coupler components, which form the actual dyes with one another under the influence of oxidizing agents, such as hydrogen peroxide. Oxidation dyes are exemplified by very long-lasting dyeing results.

When direct dyes are used, ready-made dyes diffuse from the colorant into the hair fiber. Compared to oxidative hair dyeing, the dyeing's obtained with direct dyes have a shorter shelf life and quicker wash ability. Dyeing with direct dyes usually remain on the hair for a period of between 5 and 20 washes.

The use of color pigments is known for short-term color changes on the hair and/or skin. Color pigments are generally understood to be insoluble, coloring substances. These are present undissolved in the dye formulation in the form of small particles and are only deposited from the outside on the hair fibers and/or the skin surface. Therefore, they can usually be removed again without residue by a few washes with detergents containing surfactants. Various products of this type are available on the market under the name hair mascara.

If the user wants particularly long-lasting dyeing's, the use of oxidative dyes has so far been his only option. However, despite numerous optimization attempts, an unpleasant ammonia or amine odor cannot be completely avoided in oxidative hair dyeing. The hair damage still associated with the use of oxidative dyes also has a negative effect on the user's hair.

EP 2168633 B1 deals with the task of producing long-lasting hair colorations using pigments. The paper teaches that when the combination of a pigment, an organic silicon compound, a film-forming polymer and a solvent is used on hair, it is possible to create colorations that are particularly resistant to shampooing.

In the teaching disclosed in EP 2168633 B1, pigment, organic silicon compound and polymer are either applied together to the keratin fiber, or the organic silicon compound is applied as a pretreatment agent, followed by the application of an agent containing pigment and polymer. In any case, the teaching of EP 2168633 B1 includes the joint application of pigment and polymer.

During the revision of the doctrine of EP 2168633 B1, its formulations have been adjusted. It has been shown that the disadvantages of these formulations are their still insufficient color intensities and inadequate wash fastness properties. Accordingly, the shampooing fastnesses of the colorations produced in EP 2168633 B1 still need improvement.

BRIEF SUMMARY

Kits-of-parts and processes for dyeing keratinous material are provided. In an embodiment, a process for dyeing keratinous material comprising the following steps:

applying an agent (a) to the keratinous material, wherein the agent (a) comprises:

(a1) at least one organic silicon compound selected from the group of silanes having one, two or three silicon atoms, and (a2) at least one colorant compound selected from the group of pigments and/or direct dyes, and applying an agent (b) to the keratinous material, wherein the agent (b) comprises:

(b1) at least one film-forming polymer.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

The purpose of the present intention was to provide a dyeing system with fastness properties comparable to those of oxidative dyeing. In particular, the color intensities and wash fastnesses should be outstanding, but the use of the oxidation dye precursors normally used for this purpose should be avoided. A technology was sought that would enable colorant compounds known from the prior art (such as pigments and direct-acting dyes) to be fixed in an extremely durable manner to keratin materials, especially hair. Even after multiple washes (such as hair washes), the colorant compounds placed on the keratin materials should not detach from the keratin material.

Surprisingly, it has now been found that the task can be excellently solved if keratinous materials, in particular human hair, are treated or dyed by a process comprising the successive application of two agents (a) and (b). Here, the first agent (a) comprises at least one organic silicon compound selected from the group of silanes having one, two or three silicon atoms, and further comprises at least one color-imparting compound. In the medium (a), the organic silicon compound and the colorant compound are thus prepared together. The second agent (b) comprises at least one film-forming polymer.

A first object of the present disclosure is a method for coloring keratinous material, in particular human hair, comprising the following steps:

Application of an agent (a) to the keratinous material, wherein the agent (a) comprises:

(a1) at least one organic silicon compound selected from the group of silanes having one, two or three silicon atoms, and (a2) at least one colorant compound selected from the group of pigments and/or direct dyes, and Application of an agent (b) to the keratinous material, wherein the agent (b) comprises:

(b1) at least one film-forming polymer.

In the work leading to the present invention, it has been found that the preferential successive application of agents (a) and (b) enables the production of very stable and washfast dyeing's on the keratin materials. Without being limited to this theory, it is suspected in this context that the joint application of organic silicone compound (a1) and color-imparting compound (a2) leads to the formation of a particularly resistant first film on the keratin material. With the application of the second agent (b), the film-forming polymer (b1) is now deposited on this first layer in the form of a further film.

Due to this special type of packaging—i.e., the joint application of silane (a1) and colorant compound (a2) and separate application of the film-forming polymer (b1)—the multilayer film system produced in this way exhibited improved resistance to external influences. In this way, the colorant compounds (a2) were permanently fixed to the keratin material, so that extremely washfast colorations with good resistance to shampooing could be obtained.

Process for Dyeing Keratinous Material

Keratinous material includes hair, skin, nails (such as fingernails and/or toenails). Wool, furs, and feathers also fall under the definition of keratinous material. Preferably, keratinous material is understood to be human hair, human skin, and human nails, especially fingernails and toenails. Keratinous material is understood to be human hair.

Agent (a) and (b)

In the procedure as contemplated herein, agents (a) and (b) are applied to the keratinous material, in particular human hair. The two agents (a) and (b) are different.

In other words, a first object of the present disclosure is a method for treating keratinous material, in particular human hair, comprising the following steps:

Application of an agent (a) to the keratinous material, wherein the agent (a) comprises:

(a1) at least one organic silicon compound selected from the group of silanes having one, two or three silicon atoms, and (a2) at least one colorant compound selected from the group of pigments and/or direct dyes, and Application of an agent (b) to the keratinous material, wherein the agent (b) comprises:

(b1) at least one film-forming polymer, where the two agents (a) and (b) are different.

Agent (a)

Preferably, the composition (a) contains the ingredients (a1) and (a2) essential to the present disclosure in a cosmetic carrier, particularly preferably in an aqueous or aqueous-alcoholic cosmetic carrier. This cosmetic carrier can be liquid, gel or cream.

Pasty, solid or powdery cosmetic carriers can also be used for the preparation of agent (a). To hair treatment, in particular hair coloring, such carriers are, for example, creams, emulsions, gels, or also surfactant-containing foaming solutions, such as shampoos, foam aerosols, foam formulations or other preparations suitable for application to the hair.

Preferably, the cosmetic carrier contains—based on its weight—at least 2% by weight of water. Further preferably, the water content is above 10% by weight, still further preferably above 20% by weight and particularly preferably above 40% by weight. The cosmetic carrier can also be aqueous-alcoholic. Aqueous/alcoholic solutions in the context of the present disclosure are aqueous solutions containing from about 2 to about 70% by weight of a $C_1$-$C_4$ alcohol, more particularly ethanol or isopropanol. The agents as contemplated herein may additionally contain other organic solvents, such as methoxybutanol, benzyl alcohol, ethyl diglycol or 1,2-propylene glycol. Preferred are all water-soluble organic solvents.

Organic Silicon Compounds from the Group of Silanes (a1)

As an ingredient (a1) essential to the invention, the composition (a) contains at least one organic silicon compound from the group of silanes having one, two or three silicon atoms.

Particularly preferably, the agent (a) contains at least one organic silicon compound (a1) selected from silanes having one, two or three silicon atoms, the organic silicon compound comprising one or more hydroxyl groups and/or hydrolyzable groups per molecule.

These organic silicon compounds (a1) or organic silanes contained in the agent (a) is reactive compounds.

Organic silicon compounds, alternatively called organosilicon compounds, are compounds which either have a direct silicon-carbon bond (Si—C) or in which the carbon is bonded to the silicon atom via an oxygen, nitrogen, or sulfur atom. The organic silicon compounds as contemplated herein are compounds containing one to three silicon atoms. Organic silicon compounds preferably contain one or two silicon atoms.

According to IUPAC rules, the term silane chemical compounds based on a silicon skeleton and hydrogen. In organic silanes, the hydrogen atoms are completely or partially replaced by organic groups such as (substituted) alkyl groups and/or alkoxy groups. In organic silanes, some of the hydrogen atoms may also be replaced by hydroxy groups.

In a particularly preferred embodiment, a method as contemplated herein is exemplified by the application of an agent (a) to the keratinous material, said agent (a) comprising at least one organic silicon compound (a1) selected from silanes having one, two or three silicon atoms, said organic silicon compound further comprising one or more hydroxyl groups or hydrolyzable groups per molecule.

In a very particularly preferred embodiment, a process as contemplated herein is exemplified by the application of an agent (a) to the keratinous material, said agent (a) comprising at least one organic silicon compound (a1) selected from silanes having one, two or three silicon atoms, said organic silicon compound further comprising one or more basic chemical functions and one or more hydroxyl groups or hydrolyzable groups per molecule.

This basic group or basic chemical function can be, for example, an amino group, an alkylamino group or a dialkylamino group, which is preferably connected to a silicon atom via a linker. The basic group is preferably an amino group, a $C_1$-$C_6$ alkylamino group or a di($C_1$-$C_6$)alkylamino group.

The hydrolyzable group(s) is (are) preferably a $C_1$-$C_6$ alkoxy group, especially an ethoxy group or a methoxy group. It is preferred when the hydrolyzable group is directly bonded to the silicon atom. For example, if the hydrolyzable group is an ethoxy group, the organic silicon compound preferably contains a structural unit R'R"R'"Si—O—CH2-CH3. The residues R', R" and R'" represent the three remaining free valences of the silicon atom.

A particularly preferred method as contemplated herein is exemplified in that the composition comprises (a) at least one organic silicon compound selected from silanes having one, two or three silicon atoms, the organic silicon compound preferably comprising one or more basic chemical functions and one or more hydroxyl groups or hydrolyzable groups per molecule.

Very particularly good results could be obtained if the agent (a) as contemplated herein contains at least one organic silicon compound (a1) of formula (I) and/or (II).

The compounds of formulae (I) and (II) are organic silicon compounds selected from silanes having one, two or three silicon atoms, the organic silicon compound comprising one or more hydroxyl groups and/or hydrolysable groups per molecule.

In another very particularly preferred embodiment, a process as contemplated herein is exemplified in that an agent (a) is applied to the keratinous material (or human hair), the agent (a) comprising at least one organic silicon compound (a1) of the formula (I) and/or (II), $$R_1R_2N\text{-}L\text{-}Si(OR_3)_a(R_4)_b \quad (I),$$

where $R_1$, $R_2$ independently represent a hydrogen atom or a $C_1$-$C_6$ alkyl group, L is a linear or branched divalent $C_1$-$C_{20}$ alkylene group, $R_3$ represents a hydrogen atom or a $C_1$-$C_6$ alkyl group, $R_4$ represents a $C_1$-$C_6$ alkyl group a, stands for an integer from 1 to 3, and b stands for the integer 3−a,

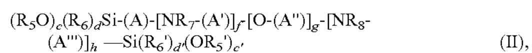

$$(R_5O)_c(R_6)_dSi\text{-}(A)\text{-}[NR_7\text{-}(A')]_f\text{-}[O\text{-}(A'')]_g\text{-}[NR_8\text{-}(A''')]_h\text{—}Si(R_6')_{d'}(OR_5')_{c'} \quad (II),$$

where

R5, R5', R5" independently represent a hydrogen atom or a $C_1$-$C_6$ alkyl group, R6, R6' and R6" independently represent a $C_1$-$C_6$ alkyl group, A, A', A", A'" and A"" independently of one another represent a linear or branched divalent $C_1$-$C_{20}$ alkylene group $R_7$ and $R_8$ independently represent a hydrogen atom, a $C_1$-$C_6$ alkyl group, a hydroxy $C_1$-$C_6$ alkyl group, a $C_2$-$C_6$ alkenyl group, an amino $C_1$-$C_6$ alkyl group or a group of formula (III)

$$\text{-}(A'''')\text{-}Si(R_6'')_{d''}(OR_5'')_{c''} \quad (III),$$

c, stands for an integer from 1 to 3, d stands for the integer 3−c, c' stands for an integer from 1 to 3, d' stands for the integer 3−c', c" stands for an integer from 1 to 3, d" stands for the integer 3−c", e stands for 0 or 1, f stands for 0 or 1, g stands for 0 or 1, h stands for 0 or 1, provided that at least one of e, f, g, and h is different from 0.

The substituents $R_1$, $R_2$, $R_3$, $R_4$, $R_5$, $R_5'$, $R_5''$, $R_6$, $R_6'$, $R_6''$, $R_7$, $R_8$, L, A, A', A", A'" and A"" in the compounds of formula (I) and (II) are explained below as examples:

Examples of a $C_1$-$C_6$ alkyl group are the groups methyl, ethyl, propyl, isopropyl, n-butyl, s-butyl, and t-butyl, n-pentyl and n-hexyl. Propyl, ethyl, and methyl are preferred alkyl radicals. Examples of a $C_2$-$C_6$ alkenyl group are vinyl, allyl, but-2-enyl, but-3-enyl and isobutenyl, preferred $C_2$-$C_6$ alkenyl radicals are vinyl and allyl. Preferred examples of a hydroxy $C_1$-$C_6$ alkyl group are a hydroxymethyl, a 2-hydroxyethyl, a 2-hydroxypropyl, a 3-hydroxypropyl, a 4-hydroxybutyl group, a 5-hydroxypentyl and a 6-hydroxyhexyl group; a 2-hydroxyethyl group is particularly preferred. Examples of an amino $C_1$-$C_6$ alkyl group are the aminomethyl group, the 2-aminoethyl group, the 3-aminopropyl group. The 2-aminoethyl group is particularly preferred. Examples of a linear divalent $C_1$-$C_{20}$ alkylene group include the methylene group (—$CH_2$—), the ethylene group (—$CH_2$—$CH_2$—), the propylene group (—$CH_2$—$CH_2$—$CH_2$—) and the butylene group (—$CH_2$—$CH_2$—$CH_2$—). The propylene group (—$CH_2$—$CH_2$—$CH_2$—) is particularly preferred. From a chain length of 3 C atoms, divalent alkylene groups can also be branched. Examples of branched divalent $C_3$-$C_{20}$ alkylene groups are (—$CH_2$—$CH(CH_3)$—) and (—$CH_2$—$CH(CH_3)$—$CH_2$—).

In the organic silicon compounds of the formula (I)

$$R_1R_2N\text{-}L\text{-}Si(OR_3)_a(R_4)_b \quad (I),$$

the radicals $R_1$ and $R_2$ independently of one another represent a hydrogen atom or a $C_1$-$C_6$ alkyl group. In particular, the radicals $R_1$ and $R_2$ both represent a hydrogen atom.

In the middle part of the organic silicon compound is the structural unit or the linker -L- which stands for a linear or branched, divalent $C_1$-$C_{20}$ alkylene group.

A divalent $C_1$-$C_{20}$ alkylene group may alternatively be referred to as a divalent or divalent $C_1$-$C_{20}$ alkylene group, by which is meant that each L grouping may form two bonds. One bond is from the amino group $R_1R_2N$ to the linker L, and the second bond is between the linker L and the silicon atom.

Preferably, -L- represents a linear, divalent (i.e., divalent) $C_1$-$C_{20}$ alkylene group. Further preferably -L- stands for a linear divalent $C_1$-$C_6$ alkylene group. Particularly preferred -L stands for a methylene group (—$CH_2$—), an ethylene group (—$CH_2$—$CH_2$—), propylene group (—$CH_2$—$CH_2$—$CH_2$—) or butylene (—$CH_2$—$CH_2$—$CH_2$—$CH_2$—). L stands for a propylene group (—$CH_2$—$CH_2$—$CH_2$—)

The linear propylene group (—$CH_2$—$CH_2$—$CH_2$—) can alternatively be referred to as the propane-1,3-diyl group.

The organic silicon compounds of formula (I)

$$R_1R_2N\text{-}L\text{-}Si(OR_3)_a(R_4)_b \quad (I),$$

one end of each carries the silicon-containing group —$Si(OR_3)_a(R_4)_b$

In the terminal structural unit —$Si(OR_3)_a(R_4)_b$, $R_3$ is hydrogen or $C_1$-$C_6$ alkyl group, and $R_4$ is $C_1$-$C_6$ alkyl group. $R_3$ and $R_3$ independently of each other represent a methyl group or an ethyl group.

Here a stands for an integer from 1 to 3, and b stands for the integer 3−a. If a stands for the number 3, then b is equal to 0. If a stands for the number 2, then b is equal to 1. If a stands for the number 1, then b is equal to 2.

Particularly resistant films could be produced if the agent (a) contains at least one organic silicon compound (a1) of formula (I) in which the radicals $R_3$, $R_4$ independently of one another represent a methyl group or an ethyl group.

When using the process as contemplated herein for dyeing keratin material, dyeing's with the best wash fastnesses could be obtained analogously when the agent (a) contains at least one organic silicon compound of formula (I) in which the radicals $R_3$, $R_4$ independently of one another represent a methyl group or an ethyl group.

Furthermore, dyeing's with the best wash fastness properties could be obtained if the agent as contemplated herein contains at least one organic silicon compound of formula (I) in which the radical a represents the number 3. In this case the rest b stands for the number 0.

In a further preferred embodiment, the agent (a) used in the process as contemplated herein is exemplified in that it comprises at least one organic silicon compound (a1) of the formula (I), where $R_3$, $R_4$ independently of one another represent a methyl group or an ethyl group and a stands for the number 3 and b stands for the number 0.

In a further preferred embodiment, a process as contemplated herein is exemplified in that the agent (a) comprises at least one organic silicon compound (a1) of the formula (I), $$R_1R_2N\text{-}L\text{-}Si(OR_3)_a(R_4)_b \quad (I),$$

where $R_1$, $R_2$ both represent a hydrogen atom, and

L represents a linear, divalent $C_1$-$C_6$-alkylene group, preferably a propylene group (—$CH_2$—$CH_2$—$CH_2$—) or an ethylene group (—$CH_2$—$CH_2$—), $R_3$ represents a hydrogen atom, an ethyl group, or a methyl group, $R_4$ represents a methyl group or an ethyl group, a stands for the number 3 and b stands for the number 0.

Organic silicon compounds of the formula (I) which are particularly suitable for solving the problem as contemplated herein are

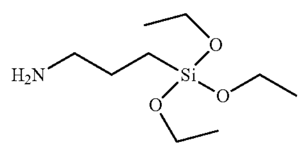

-(3-Aminopropyl)triethoxysilane

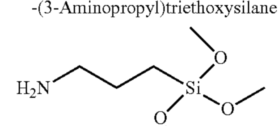

-(3-Aminopropyl)trimethoxysilane

-1-(3-Aminopropyl)silanetriol

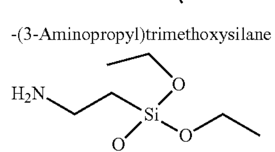

-(2-Aminoethyl)triethoxysilane

-(2-Aminoethyl)trimethoxysilane

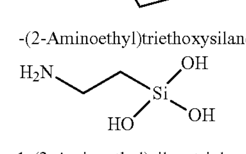

-1-(2-Aminoethyl)silanetriol

-continued

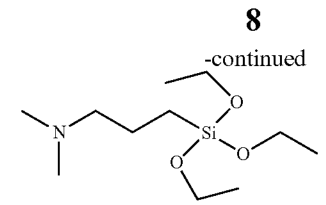

-(3-Dimethylaminopropyl)triethoxysilane

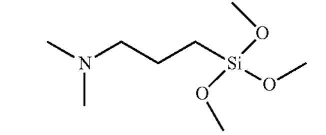

-(3-Dimethylaminopropyl)trimethoxysilane

-1-(3-Dimethylaminopropyl)silanetriol

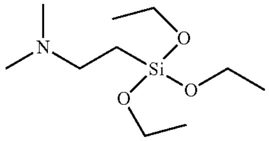

-(2-Dimethylaminoethyl)triethoxysilane

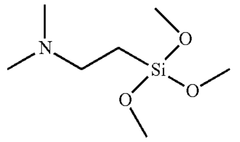

-(2-Dimethylaminoethyl)trimethoxysilane and

-1-(2-Dimethylaminoethyl)silanetriol

In a further preferred embodiment, a process as contemplated herein is exemplified in that the agent (a) comprises at least one organic silicon compound (a1) selected from the group of (3-Aminopropyl)triethoxysilane
(3-Aminopropyl)trimethoxysilane
1-(3-Aminopropyl)silantriol
(2-Aminoethyl)triethoxysilane
(2-Aminoethyl)trimethoxysilane
1-(2-Aminoethyl)silantriol
(3-Dimethylaminopropyl)triethoxysilane
(3-Dimethylaminopropyl)trimethoxysilane
1-(3-Dimethylaminopropyl)silantriol
(2-Dimethylaminoethyl)triethoxysilane
(2-Dimethylaminoethyl)trimethoxysilane and/or
1-(2-Dimethylaminoethyl)silantriol.

The organic silicon compounds of formula (I) are commercially available. (3-aminopropyl)trimethoxysilane, for example, can be purchased from Sigma-Aldrich. Also (3-aminopropyl)triethoxysilane is commercially available from Sigma-Aldrich.

In a further embodiment, the composition as contemplated herein comprises at least one organic silicon compound (a1) of the formula (II)

$$(R_5O)_c(R_6)_dSi\text{-}(A)_e\text{-}[NR_7\text{-}(A')]_f\text{-}[O\text{-}(A'')]_g\text{-}[NR_8\text{-}(A''')]_h\text{—}Si(R_6')_{d'}(OR_5')_{c'} \quad (II).$$

The organosilicon compounds of formula (II) as contemplated herein each carry the silicon-containing groups $(R_5O)_c(R_6)_dSi$— and —$Si(R_6')_{d'}(OR_5')_{c'}$ at both ends.

In the central part of the molecule of formula (II) there are the groups $-(A)_e-$ and —$[NR_7-(A')]_f-$ and —$[O-(A'')]_g-$ and —$[NR_8-(A''')]_h-$. Here, each of the radicals e, f, g, and h can independently of one another stand for the number 0 or 1, with the proviso that at least one of the radicals e, f, g, and h is different from 0. In other words, an organic silicon compound of formula (II) as contemplated herein contains at least one grouping from the group of -(A)- and —$[NR_7-(A')]$- and —$[O-(A'')]$- and —$[NR_8-(A''')]$-.

In the two terminal structural units $(R_5O)_c(R_6)_dSi$— and —$Si(R_6')_{d'}(OR_5')_c$, the radicals R5, R5', R5" independently of one another represent a hydrogen atom or a $C_1$-$C_6$ alkyl group. The radicals R6, R6' and R6" independently represent a $C_1$-$C_6$ alkyl group.

Here a stands for an integer from 1 to 3, and d stands for the integer 3−c. If c stands for the number 3, then d is equal to 0. If c stands for the number 2, then d is equal to 1. If c stands for the number 1, then d is equal to 2.

Analogously c' stands for a whole number from 1 to 3, and d' stands for the whole number 3−c'. If c' stands for the number 3, then d' is 0. If c' stands for the number 2, then d' is 1. If c' stands for the number 1, then d' is 2.

Films with the highest stability or dyes with the best wash fastnesses could be obtained when the residues c and c' both stand for the number 3. In this case d and d' both stand for the number 0.

In a further preferred embodiment, a process as contemplated herein is exemplified in that the agent (a) comprises at least one organic silicon compound (a1) of the formula (II),

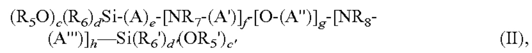

$$(R_5O)_c(R_6)_dSi\text{-}(A)_e\text{-}[NR_7\text{-}(A')]_f\text{-}[O\text{-}(A'')]_g\text{-}[NR_8\text{-}(A''')]_h\text{—}Si(R_6')_{d'}(OR_5')_{c'} \quad \text{(II)},$$

where

R5 and R5' independently represent a methyl group or an ethyl group, c and c' both stand for the number 3 and d and d' both stand for the number 0.

If c and c' are both the number 3 and d and d' are both the number 0, the organic silicon compound of the present disclosure corresponds to formula (IIa)

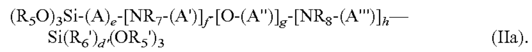

$$(R_5O)_3Si\text{-}(A)_e\text{-}[NR_7\text{-}(A')]_f\text{-}[O\text{-}(A'')]_g\text{-}[NR_8\text{-}(A''')]_h\text{—}Si(R_6')_{d'}(OR_5')_3 \quad \text{(IIa)}.$$

The radicals e, f, g, and h can independently stand for the number 0 or 1, whereby at least one radical from e, f, g, and h is different from zero. The abbreviations e, f, g, and h thus define which of the groupings $-(A)_e-$ and $[NR_7-(A')]_f-$ and —$[O-(A'')]_g$ and —$[NR8-(A''')]_h-$ are in the middle part of the organic silicon compound of formula (II).

In this context, the presence of certain groupings has proved to be particularly beneficial in terms of increasing washability. Particularly good results were obtained when at least two of the residues e, f, g, and h stand for the number 1. Especially preferred e and f both stand for the number 1. Furthermore, g and h both stand for the number 0.

If e and f both stand for the number 1 and g and h both stand for the number 0, the organic silicon compound as contemplated herein corresponds to formula (IIb)

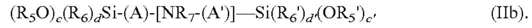

$$(R_5O)_c(R_6)_dSi\text{-}(A)\text{-}[NR_7\text{-}(A')]\text{—}Si(R_6')_{d'}(OR_5')_{c'} \quad \text{(IIb)}.$$

The radicals A, A', A", A"' and A"" independently represent a linear or branched divalent $C_1$-$C_{20}$ alkylene group. Preferably the radicals A, A', A", A"' and A"" independently of one another represent a linear, divalent $C_1$-$C_{20}$ alkylene group. Further preferably the radicals A, A', A", A"' and A"" independently represent a linear divalent $C_1$-$C_6$ alkylene group. In particular, the radicals A, A', A", A"' and A"" independently of one another represent a methylene group (—$CH_2$—), an ethylene group (—$CH_2$—$CH_2$—), a propylene group (—$CH_2$—$CH_2$—$CH_2$—) or a butylene group (—$CH_2$—$CH_2$—$CH_2$—$CH_2$—). In particular, the residues A, A', A", A"' and A"" stand for a propylene group (—$CH_2$—$CH_2$—$CH_2$—).

The divalent $C_1$-$C_{20}$ alkylene group may alternatively be referred to as a divalent or divalent $C_1$-$C_{20}$ alkylene group, by which is meant that each grouping A, A', A", A"' and A"" may form two bonds.

The linear propylene group (—$CH_2$—$CH_2$—$CH_2$—) can alternatively be referred to as the propane-1,3-diyl group.

If the radical f represents the number 1, then the organic silicon compound of formula (II) as contemplated herein contains a structural grouping —$[NR_7-(A')]$-.

If the radical f represents the number 1, then the organic silicon compound of formula (II) as contemplated herein contains a structural grouping —$[NR_8-(A''')]$-.

Wherein $R_7$ and $R_7$ independently represent a hydrogen atom, a $C_1$-$C_6$ alkyl group, a hydroxy-$C_1$-$C_6$ alkyl group, a $C_2$-$C_6$ alkenyl group, an amino-$C_1$-$C_6$ alkyl group or a group of the formula (III)

$$-(A'''')\text{-}Si(R_6'')_{d''}(OR_5'')_{c''} \quad \text{(III)}.$$

Very preferably the radicals R7 and R8 independently of one another represent a hydrogen atom, a methyl group, a 2-hydroxyethyl group, a 2-alkenyl group, a 2-aminoethyl group or a grouping of the formula (III).

If the radical f represents the number 1 and the radical h represents the number 0, the organic silicon compound as contemplated herein contains the grouping $[NR_7-(A')]$ but not the grouping —$[NR_8-(A''')]$. If the radical $R_7$ now stands for a grouping of the formula (III), the agent (a) contains an organic silicone compound with 3 reactive silane groups.

In a further preferred embodiment, a process as contemplated herein is exemplified in that the agent (a) comprises at least one organic silicon compound (a1) of the formula (II),

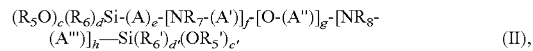

$$(R_5O)_c(R_6)_dSi\text{-}(A)_e\text{-}[NR_7\text{-}(A')]_f\text{-}[O\text{-}(A'')]_g\text{-}[NR_8\text{-}(A''')]_h\text{—}Si(R_6')_{d'}(OR_5')_{c'} \quad \text{(II)},$$

where e and f both stand for the number 1, g and h both stand for the number 0,

A and A' independently represent a linear, divalent $C_1$-$C_6$ alkylene group and $R_7$ represents a hydrogen atom, a methyl group, a 2-hydroxyethyl group, a 2-alkenyl group, a 2-aminoethyl group or a group of formula (III).

In a further preferred embodiment, a process as contemplated herein is exemplified in that the agent (a) contains at least one organic silicon compound of the formula (II), where e and f both stand for the number 1, g and h both stand for the number 0, A and A' independently of one another represent a methylene group (—$CH_2$—), an ethylene group (—$CH_2$—$CH_2$—) or a propylene group (—$CH_2$—$CH_2$—$CH_2$), and R7 represents a hydrogen atom, a methyl group, a 2-hydroxyethyl group, a 2-alkenyl group, a 2-aminoethyl group or a group of formula (III).

Organic silicon compounds of the formula (II) which are well suited for solving the problem as contemplated herein are

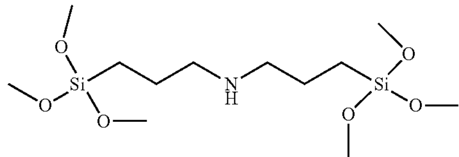

-3-(trimethoxysilyl)-N-[3-(trimethoxysilyl)propyl]-1-propanamine

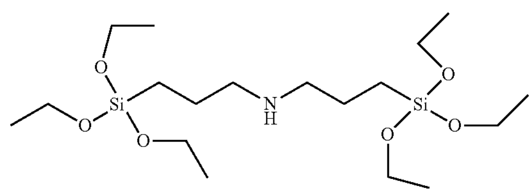

-3-(Triethoxysilyl)-N-[3-(triethoxysilyl)propyl]-1-propanamine

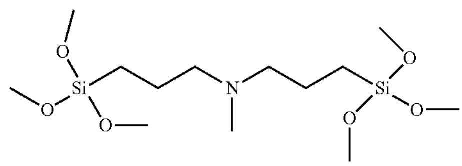

-N-methyl-3-(trimethoxysilyl)-N-[3-(trimethoxysilyl)propyl]-1-propanamine

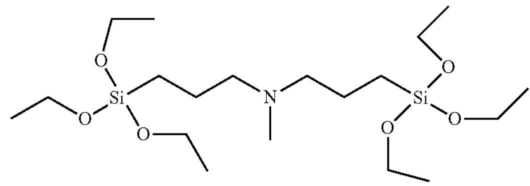

-N-Methyl-3-(triethoxysilyl)-N-[3-(triethoxysilyl)propyl]-1-propanamine

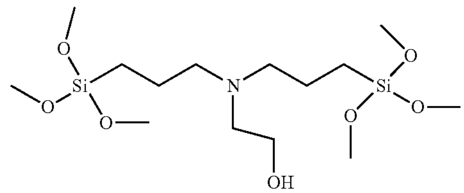

-2-[Bis[3-(trimethoxysilyl)propyl]amino]-ethanol

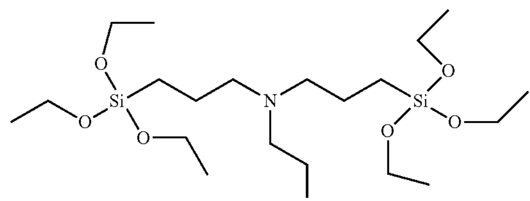

-2-[Bis[3-(triethoxysilyl)propyl]amino]ethanol

-continued

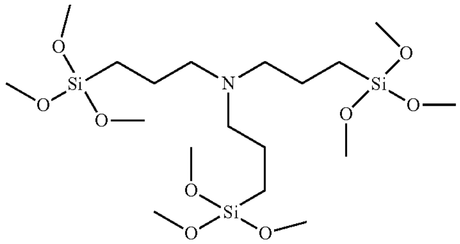

-3-(Trimethoxysilyl)-N,N-bis[3-(trimethoxysilyl)propyl]-1-propanamine

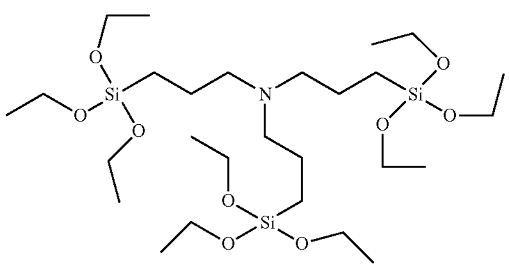

-3-(Triethoxysilyl)-N,N-bis[3-(triethoxysilyl)propyl]-1-propanamine

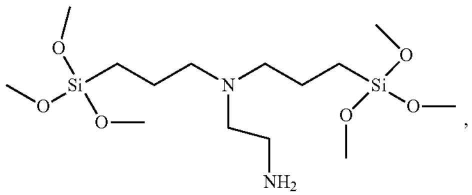

-N1,N1-Bis[3-(trimethoxysilyl)propyl]-1,2-ethanediamine

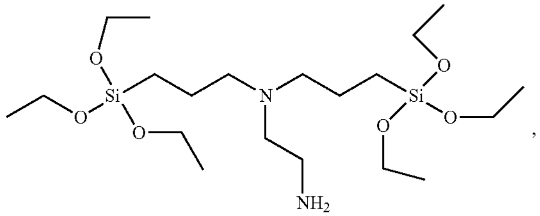

-N1,N1-Bis[3-(triethoxysilyl)propyl]-1,2-ethanediamine

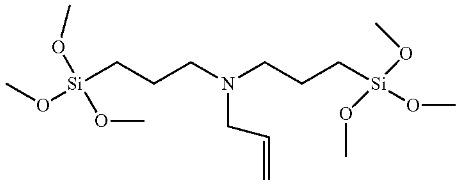

-N,N-Bis[3-(trimethoxysilyl)propyl]-2-propen-1-amine

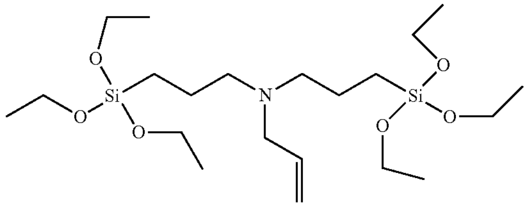

-N,N-Bis[3-(triethoxysilyl)propyl]-2-propen-1-amine

The organic silicon compounds of formula (II) are commercially available.

Bis(trimethoxysilylpropyl)amines with the CAS number 82985-35-1 can be purchased from Sigma-Aldrich.

Bis[3-(triethoxysilyl)propyl]amines with the CAS number 13497-18-2 can be purchased from Sigma-Aldrich, for example.

N-methyl-3-(trimethoxysilyl)-N-[3-(trimethoxysilyl)propyl]-1-propanamine is alternatively referred to as bis(3-trimethoxysilylpropyl)-N-methylamine and can be purchased commercially from Sigma-Aldrich or Fluorochem.

3-(triethoxysilyl)-N,N-bis[3-(triethoxysilyl)propyl]-1-propanamine with the CAS number 18784-74-2 can be purchased for example from Fluorochem or Sigma-Aldrich.

In a further preferred embodiment, a process as contemplated herein is exemplified in that the agent (a) comprises at least one organic silicon compound (a1) selected from the group of 3-(trimethoxysilyl)-N-[3-(trimethoxysilyl)propyl]-1-propanamine
3-(Triethoxysilyl)-N-[3-(triethoxysilyl)propyl]-1-propanamine
N-methyl-3-(trimethoxysilyl)-N-[3-(trimethoxysilyl)propyl]-1-propanamine
N-Methyl-3-(triethoxysilyl)-N-[3-(triethoxysilyl)propyl]-1-propanamine
2-[Bis[3-(trimethoxysilyl)propyl]amino]-ethanol
2-[bis[3-(triethoxysilyl)propyl]amino]ethanol
3-(Trimethoxysilyl)-N,N-bis[3-(trimethoxysilyl)propyl]-1-propanamine
3-(Triethoxysilyl)-N,N-bis[3-(triethoxysilyl)propyl]-1-propanamine
N1,N1-bis[3-(trimethoxysilyl)propyl]-1,2-ethanediamine,
N1,N1-bis[3-(triethoxysilyl)propyl]-1,2-ethanediamine,
N,N-bis[3-(trimethoxysilyl)propyl]-2-propen-1-amine and/or
N,N-bis[3-(triethoxysilyl)propyl]-2-propen-1-amine In further tests, in particular dyeing tests, it has also been found to be particularly advantageous if the agent (a) applied to the keratinous material in the process as contemplated herein contains at least one organic silicon compound of the formula (IV)

$$R_9Si(OR_{10})_k(R_{11})_m \quad (IV).$$

The compounds of formula (IV) are organic silicon compounds selected from silanes having one, two or three silicon atoms, the organic silicon compound comprising one or more hydroxyl groups and/or hydrolysable groups per molecule.

The organic silicon compound(s) of formula (IV) may also be called a silane of the alkyl-alkoxy-silane or alkyl-hydroxy-silane type, $$R_9Si(OR_{10})_k(R_{11})_m \quad (IV),$$

where $R_9$ represents a $C_1$-$C_{12}$, alkyl group,
$R_{10}$ represents a hydrogen atom or a $C_1$-$C_6$ alkyl group,
$R_{11}$ represents a $C_1$-$C_6$ alkyl group
k is an integer from 1 to 3, and
m stands for the integer 3−k.

In a further preferred embodiment, a process as contemplated herein is exemplified in that the agent (a) comprises at least one organic silicon compound (a1) of the formula (IV)

$$R_9Si(OR_{10})_k(R_{11})_m \quad (IV),$$

where $R_9$ represents a $C_1$-$C_{12}$ alkyl group,
$R_{10}$ represents a hydrogen atom or a $C_1$-$C_6$ alkyl group,
$R_{11}$ represents a $C_1$-$C_6$ alkyl group
k is an integer from 1 to 3, and
m stands for the integer 3−k.

In a further preferred embodiment, a process as contemplated herein is exemplified in that the agent (a) contains, in addition to the organic silicon compound(s) of formula (I), at least one further organic silicon compound of formula (IV)

$$R_9Si(OR_{10})_k(R_{11})_m \quad (IV),$$

where $R_9$ represents a $C_1$-$C_{12}$ alkyl group,
$R_{10}$ represents a hydrogen atom or a $C_1$-$C_6$ alkyl group,
$R_{11}$ represents a $C_1$-$C_6$ alkyl group
k is an integer from 1 to 3, and
m stands for the integer 3−k.

In a further preferred embodiment, a process as contemplated herein is exemplified in that the agent (a) contains, in addition to the organic silicon compound(s) of formula (II), at least one further organic silicon compound of formula (IV)

$$R_9Si(OR_{10})_k(R_{11})_m \quad (IV),$$

where $R_9$ represents a $C_1$-$C_{12}$ alkyl group,
$R_{10}$ represents a hydrogen atom or a $C_1$-$C_6$ alkyl group,
$R_{11}$ represents a $C_1$-$C_6$ alkyl group
k is an integer from 1 to 3, and
m stands for the integer 3−k.

In a further preferred embodiment, a process as contemplated herein is exemplified in that the composition contains (a) in addition to the organic silicon compound(s) of formula (I) and/or (II) at least one further organic silicon compound of formula (IV)

$$R_9Si(OR_{10})_k(R_{11})_m \quad (IV),$$

where $R_9$ represents a $C_1$-$C_{12}$ alkyl group,
$R_{10}$ represents a hydrogen atom or a $C_1$-$C_6$ alkyl group,
$R_{11}$ represents a $C_1$-$C_6$ alkyl group
k is an integer from 1 to 3, and
m stands for the integer 3−k.

In the organic silicon compounds of formula (IV), the radical $R_9$ represents a $C_1$-$C_{12}$ alkyl group. This $C_1$-$C_{12}$ alkyl group is saturated and can be linear or branched. Preferably, $R_9$ represents a linear $C_1$-$C_8$ alkyl group. Preferably $R_9$ stands for a methyl group, an ethyl group, an n-propyl group, an n-butyl group, an n-pentyl group, an n-hexyl group, an n-octyl group or an n-dodecyl group. Particularly preferably, $R_9$ represents a methyl group, an ethyl group or an n-octyl group.

In the organic silicon compounds of formula (IV), the radical $R_{10}$ represents a hydrogen atom or a $C_1$-$C_6$ alkyl group. R10 stands for a methyl group or an ethyl group.

In the organic silicon compounds of formula (IV), the radical Ru represents a $C_1$-$C_6$ alkyl group. R11 stands for a methyl group or an ethyl group.

Furthermore, k stands for a whole number from 1 to 3, and m stands for the whole number 3−k. If k stands for the number 3, then m is equal to 0. If k stands for the number 2, then m is equal to 1. If k stands for the number 1, then m is equal to 2.

Particularly stable films, i.e., dyeing's with particularly good wash fastness properties, could be obtained if an agent (a) containing at least one organic silicon compound (a1) corresponding to formula (IV): in which the radical k is the number 3, was used in the process. In this case the rest m stands for the number 0.

Organic silicon compounds of the formula (IV) which are particularly suitable for solving the problem as contemplated herein are

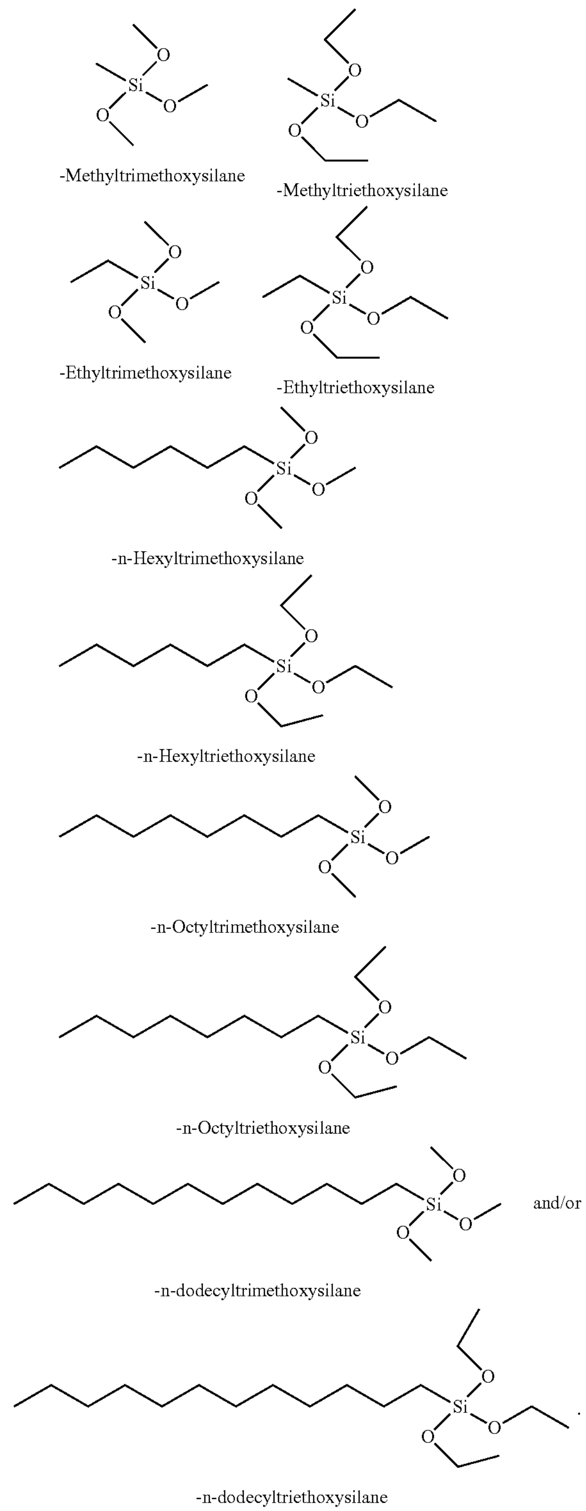

In a further preferred embodiment, a process as contemplated herein is exemplified in that the agent (a) comprises at least one organic silicon compound (a1) of formula (IV) selected from the group of Methyltrimethoxysilane
Methyltriethoxysilane
Ethyltrimethoxysilane
Ethyltriethoxysilane
Hexyltrimethoxysilane
Hexyltriethoxysilane
Octyltrimethoxysilane
Octyltriethoxysilane
Dodecyltrimethoxysilane and/or
Dodecyltriethoxysilane.

The organic silicon compounds described above are reactive compounds. In this context, it has been found preferable if the agent (a) as contemplated herein contains—based on the total weight of the agent (a)—one or more organic silicon compounds (a1) in a total amount of about 0.1 to about 20.0% by weight, preferably about 1.0 to about 15.0% by weight and particularly preferably about 2.0 to about 8.0% by weight.

In a further preferred embodiment, a process as contemplated herein is exemplified in that the agent (a) contains—based on the total weight of the agent (a)—one or more organic silicon compounds (a1) in a total amount of about 0.1 to about 20.0% by weight, preferably about 1.0 to about 15.0% by weight and particularly preferably about 2.0 to about 8.0% by weight.

To achieve particularly good dyeing results, it is particularly advantageous to use the organic silicon compounds of the formula (I) and/or (II) in certain quantity ranges on average (a). Particularly preferably, the agent (a) contains—based on the total weight of the agent (a)—one or more organic silicon compounds of the formula (I) and/or (II) in a total amount of about 0.1 to about 10.0% by weight, preferably about 0.5 to about 5.0% by weight and particularly preferably about 0.5 to about 3.0% by weight.

In a further preferred embodiment, a process as contemplated herein is exemplified in that the agent (a)—based on the total weight of agent (a)—contains one or more organic silicon compounds of formula (I) and/or (II) in a total amount of about 0.1 to about 10.0% by weight, preferably about 0.5 to about 5.0% by weight and particularly preferably about 0.5 to about 3.0% by weight.

Furthermore, it has proven to be particularly preferred if the organic silicon compound(s) of formula (IV) is (are) also present in certain quantity ranges in average (a). Particularly preferably the agent (a) contains—based on the total weight of agent (a)—one or more organic silicon compounds of the formula (IV) in a total amount of about 0.1 to about 20.0% by weight, preferably about 2.0 to about 15.0% by weight and particularly preferably about 4.0 to about 9.0% by weight.

In a further preferred embodiment, a process as contemplated herein is exemplified in that the agent (a)—based on the total weight of agent (a)—contains one or more organic silicon compounds of formula (IV) in a total amount of about 0.1 to about 20.0% by weight, preferably about 2.0 to about 15.0% by weight and particularly preferably about 3.2 to about 10.0% by weight.

In the course of the work leading to this invention, it was found that particularly stable and uniform films could be obtained on the keratin material even if the agent (a) contained two organic silicon compounds that were structurally different from each other.

In another preferred embodiment, a process as contemplated herein is exemplified in that the agent (a) contains at least two structurally different organic silicon compounds.

In an explicitly quite particularly preferred embodiment, a process as contemplated herein is exemplified in that an agent (a) is applied to the keratinous material, which agent contains at least one organic silicone compound of the formula (I) which is selected from the group of (3-aminopropyl)triethoxysilane and (3-aminopropyl)trimethoxysilane, and additionally contains at least one organic silicone compound of the formula (IV) which is selected from the group of methyltrimethoxysilane, methyltriethoxysilane, ethyltrimethoxysilane and ethyltriethoxysilane.

In a further preferred embodiment, a process as contemplated herein is exemplified in that the agent (a)—based on the total weight of agent (a)—contains:

from about 0.5 to about 5.0% by weight of at least one first organic silicon compound (a1) selected from the group of (3-aminopropyl)trimethoxysilane, (3-aminopropyl)triethoxysilane, (2-aminoethyl)trimethoxysilane, (2-aminoethyl)triethoxysilane, (3-dimethylaminopropyl)trimethoxysilane, (3-dimethylaminopropyl)triethoxysilane (2-dimethylaminoethyl)trimethoxysilane and (2-dimethylaminoethyl)triethoxysilane, and from about 3.2 to about 10.0% by weight of at least one second organic silicon compound (a1) selected from the group of methyltrimethoxysilane, methyltriethoxysilane, ethyltrimethoxysilane, ethyltriethoxysilane, octyltrimethoxysilane, octyltriethoxysilane, dodecyltrimethoxysilane and dodecyltriethoxysilane.

In this version, the agent contains (a) one or more organic silicon compounds of a first group in a total amount of about 0.5 to about 3.0% by weight. The organic silicon compounds of this first group are selected from the group of (3-aminopropyl)trimethoxysilane, (3-aminopropyl)triethoxysilane, (2-aminoethyl)trimethoxysilane, (2-aminoethyl)triethoxysilane, (3-dimethylaminopropyl)trimethoxysilane, (3-dimethylaminopropyl)triethoxysilane (2-dimethylaminoethyl) trimethoxysilane and/or (2-dimethylaminoethyl) triethoxysilane.

In this version, the agent contains (a) one or more organic silicon compounds of a second group in a total amount of about 3.2 to about 10.0% by weight. The organic silicon compounds of this second group are selected from the group of methyltrimethoxysilane, methyltriethoxysilane, ethyltrimethoxysilane, ethyltriethoxysilane, octyltrimethoxysilane, octyltriethoxysilane, dodecyltrimethoxysilane and/or dodecyltriethoxysilane.

Color-Forming Compounds (a2)

When agent (a) is applied to the keratin material, the organic silicon compound(s) (a1) comprising one or more hydroxyl groups or hydrolyzable groups per molecule are first hydrolyzed and oligomerized or polymerized in the presence of the water. The resulting hydrolysis products or oligomers have a particularly high affinity to the surface of the Keratin material. The simultaneous presence of the colorant compounds (a2) in the agent (a) integrates them into the resulting oligomers or polymers to form a colored film on the keratin material. Following the application of agent (a), agent (b) is now applied, whereby the film-forming polymers (b1) contained in this agent (b) are deposited on the keratinous material in the form of a second film. The successive application of agents (a) and (b) thus creates a layering of several films that is particularly resistant to external influences. The colorant compounds trapped in these resistant films exhibit extremely good wash fastness.

As an essential component (a2) of the invention, the agent (a) used in the process as contemplated herein therefore contains at least one colorant compound from the group of pigments and/or direct dyes.

The use of pigments has proved to be particularly preferable in this context.

In another very particularly preferred embodiment, a process as contemplated herein is exemplified in that the agent (a) comprises at least one colorant compound (a2) from the group of pigments.

Pigments within the meaning of the present disclosure are coloring compounds which have a solubility in water at 25° C. of less than 0.5 g/L, preferably less than 0.1 g/L, even more preferably less than 0.05 g/L. Water solubility can be determined, for example, by the method described below: 0.5 g of the pigment are weighed in a beaker. A stir-fish is added. Then one liter of distilled water is added. This mixture is heated to 25° C. for one hour while stirring on a magnetic stirrer. If undissolved components of the pigment are still visible in the mixture after this period, the solubility of the pigment is below 0.5 g/L. If the pigment-water mixture cannot be assessed visually due to the high intensity of the possibly finely dispersed pigment, the mixture is filtered. If a proportion of undissolved pigments remains on the filter paper, the solubility of the pigment is below 0.5 g/L.

Suitable color pigments can be of inorganic and/or organic origin.

In a preferred embodiment, an agent as contemplated herein is exemplified in that the agent (a) contains at least one colorant compound (a2) from the group of inorganic and/or organic pigments.

Preferred color pigments are selected from synthetic or natural inorganic pigments. Inorganic color pigments of natural origin can be produced, for example, from chalk, ochre, umber, green earth, burnt Terra di Siena or graphite. Furthermore, black pigments such as iron oxide black, colored pigments such as ultramarine or iron oxide red as well as fluorescent or phosphorescent pigments can be used as inorganic color pigments.

Particularly suitable are colored metal oxides, hydroxides and oxide hydrates, mixed-phase pigments, sulfur-containing silicates, silicates, metal sulfides, complex metal cyanides, metal sulphates, chromates and/or molybdates. Preferred color pigments are black iron oxide (CI 77499), yellow iron oxide (CI 77492), red and brown iron oxide (CI 77491), manganese violet (CI 77742), ultramarine (sodium aluminum sulfo silicates, CI 77007, pigment blue 29), chromium oxide hydrate (CI77289), iron blue (ferric ferrocyanides, CI77510) and/or carmine (cochineal).

As contemplated herein, colored pearlescent pigments are also particularly preferred color pigments. These are usually mica- and/or mica-based and can be coated with one or more metal oxides. Mica belongs to the layer silicates. The most important representatives of these silicates are muscovite, phlogopite, paragonite, biotite, lepidolite and margarite. To produce the pearlescent pigments in combination with metal oxides, the mica, mainly muscovite or phlogopite, is coated with a metal oxide.

As an alternative to natural mica, synthetic mica coated with one or more metal oxides can also be used as pearlescent pigment. Especially preferred pearlescent pigments are based on natural or synthetic mica (mica) and are coated with one or more of the metal oxides mentioned above. The color of the respective pigments can be varied by varying the layer thickness of the metal oxide(s).

In a further preferred embodiment, a process as contemplated herein is exemplified in that the agent (a) comprises at least one colorant compound (a2) from the group of inorganic pigments selected from the group of colored metal oxides, metal hydroxides, metal oxide hydrates, silicates, metal sulfides, complex metal cyanides, metal sulfates, bronze pigments and/or from colored mica- or mica-based pigments coated with at least one metal oxide and/or a metal oxychloride.

In a further preferred embodiment, a process as contemplated herein is exemplified in that the agent (a) comprises at least one colorant compound (a2) from the group of pigments selected from mica- or mica-based pigments which are reacted with one or more metal oxides from the group of titanium dioxide (CI 77891), black iron oxide (CI 77499), yellow iron oxide (CI 77492), red and/or brown iron oxide (CI 77491, CI 77499), manganese violet (CI 77742), ultramarine (sodium aluminum sulfosilicates, CI 77007, Pigment Blue 29), chromium oxide hydrate (CI 77289), chromium oxide (CI 77288) and/or iron blue (ferric ferrocyanide, CI 77510).

Examples of particularly suitable color pigments are commercially available under the trade names Rona®, Colorona®, Xirona®, Dichrona® and Timiron® from Merck, Ariabel® and Unipure® from Sensient, Prestige® from Eckart Cosmetic Colors and Sunshine® from Sunstar.

Particularly preferred color pigments with the trade name Colorona® are, for example:

- Colorona Copper, Merck, MICA, CI 77491 (IRON OXIDES)
- Colorona Passion Orange, Merck, Mica, CI 77491 (Iron Oxides), Alumina
- Colorona Patina Silver, Merck, MICA, CI 77499 (IRON OXIDES), CI 77891 (TITANIUM DIOXIDE)
- Colorona RY, Merck, CI 77891 (TITANIUM DIOXIDE), MICA, CI 75470 (CARMINE)
- Colorona Oriental Beige, Merck, MICA, CI 77891 (TITANIUM DIOXIDE), CI 77491 (IRON OXIDES)
- Colorona Dark Blue, Merck, MICA, TITANIUM DIOXIDE, FERRIC FERROCYANIDE
- Colorona Chameleon, Merck, CI 77491 (IRON OXIDES), MICA
- Colorona Aborigine Amber, Merck, MICA, CI 77499 (IRON OXIDES), CI 77891 (TITANIUM DIOXIDE)
- Colorona Blackstar Blue, Merck, CI 77499 (IRON OXIDES), MICA
- Colorona Patagonian Purple, Merck, MICA, CI 77491 (IRON OXIDES), CI 77891 (TITANIUM DIOXIDE), CI 77510 (FERRIC FERROCYANIDE)
- Colorona Red Brown, Merck, MICA, CI 77491 (IRON OXIDES), CI 77891 (TITANIUM DIOXIDE)
- Colorona Russet, Merck, CI 77491 (TITANIUM DIOXIDE), MICA, CI 77891 (IRON OXIDES)
- Colorona Imperial Red, Merck, MICA, TITANIUM DIOXIDE (CI 77891), D&C RED NO. 30 (CI 73360)
- Colorona Majestic Green, Merck, CI 77891 (TITANIUM DIOXIDE), MICA, CI 77288 (CHROMIUM OXIDE GREENS)
- Colorona Light Blue, Merck, MICA, TITANIUM DIOXIDE (CI 77891), FERRIC FERROCYANIDE (CI 77510)
- Colorona Red Gold, Merck, MICA, CI 77891 (TITANIUM DIOXIDE), CI 77491 (IRON OXIDES)
- Colorona Gold Plus MP 25, Merck, MICA, TITANIUM DIOXIDE (CI 77891), IRON OXIDES (CI 77491)
- Colorona Carmine Red, Merck, MICA, TITANIUM DIOXIDE, CARMINE
- Colorona Blackstar Green, Merck, MICA, CI 77499 (IRON OXIDES)
- Colorona Bordeaux, Merck, MICA, CI 77491 (IRON OXIDES)
- Colorona Bronze, Merck, MICA, CI 77491 (IRON OXIDES)
- Colorona Bronze Fine, Merck, MICA, CI 77491 (IRON OXIDES)
- Colorona Fine Gold MP 20, Merck, MICA, CI 77891 (TITANIUM DIOXIDE), CI 77491 (IRON OXIDES)
- Colorona Sienna Fine, Merck, CI 77491 (IRON OXIDES), MICA
- Colorona Sienna, Merck, MICA, CI 77491 (IRON OXIDES)
- Colorona Precious Gold, Merck, Mica, CI 77891 (Titanium dioxide), Silica, CI 77491 (Iron oxides), Tin oxide
- Colorona Sun Gold Sparkle MP 29, Merck, MICA, TITANIUM DIOXIDE, IRON OXIDES, MICA, CI 77891, CI 77491 (EU)
- Colorona Mica Black, Merck, CI 77499 (Iron oxides), Mica, CI 77891 (Titanium dioxide)
- Colorona Bright Gold, Merck, Mica, CI 77891 (Titanium dioxide), CI 77491 (Iron oxides)
- Colorona Blackstar Gold, Merck, MICA, CI 77499 (IRON OXIDES)

Other particularly preferred color pigments with the trade name Xirona® are for example:

- Xirona Golden Sky, Merck, Silica, CI 77891 (Titanium Dioxide), Tin Oxide
- Xirona Caribbean Blue, Merck, Mica, CI 77891 (Titanium Dioxide), Silica, Tin Oxide
- Xirona Kiwi Rose, Merck, Silica, CI 77891 (Titanium Dioxide), Tin Oxide
- Xirona Magic Mauve, Merck, Silica, CI 77891 (Titanium Dioxide), Tin Oxide.

In addition, particularly preferred color pigments with the trade name Unipure® are for example:

- Unipure Red LC 381 EM, Sensient CI 77491 (Iron Oxides), Silica
- Unipure Black LC 989 EM, Sensient, CI 77499 (Iron Oxides), Silica
- Unipure Yellow LC 182 EM, Sensient, CI 77492 (Iron Oxides), Silica In a further embodiment of the process as contemplated herein, the agent (a) may also contain one or more colorant compounds from the group of organic pigments.

The organic pigments as contemplated herein are correspondingly insoluble, organic dyes or color lacquers, which may be selected, for example, from the group of nitroso, nitro-azo, xanthene, anthraquinone, isoindolinone, isoindolinone, quinacridone, perinone, perylene, diketo-pyrrolopyrrole, indigo, thioindido, dioxazine and/or triarylmethane compounds.

Examples of particularly suitable organic pigments are carmine, quinacridone, phthalocyanine, sorghum, blue pigments with the Color Index numbers CI 42090, CI 69800, CI 69825, CI 73000, CI 74100, CI 74160, yellow pigments with the Color Index numbers CI 11680, CI 11710, CI 15985, CI 19140, CI 20040, CI 21100, CI 21108, CI 47000, CI 47005, green pigments with the Color Index numbers CI 61565, CI 61570, CI 74260, orange pigments with the Color Index numbers CI 11725, CI 15510, CI 45370, CI 71105, red pigments with the Color Index numbers CI 12085, CI 12120, CI 12370, CI 12420, CI 12490, CI 14700, CI 15525, CI 15580, CI 15620, CI 15630, CI 15800, CI 15850, CI 15865, CI 15880, CI 17200, CI 26100, CI 45380, CI 45410, CI 58000, CI 73360, CI 73915 and/or CI 75470.

In another particularly preferred embodiment, a process as contemplated herein is exemplified in that the composition (a) comprises at least one colorant compound (a2) from the group of organic pigments selected from the group of carmine, quinacridone, phthalocyanine, sorghum, blue pigments having the color index numbers CI 42090, CI 69800, CI 69825, CI 73000, CI 74100, CI 74160, yellow pigments having the color index numbers CI 11680, CI 11710, CI 15985, CI 19140, CI 20040, CI 21100, CI 21108, CI 47000, CI 47005, green pigments with Color Index numbers CI 61565, CI 61570, CI 74260, orange pigments with Color Index numbers CI 11725, CI 15510, CI 45370, CI 71105, red pigments with the Color Index numbers CI 12085, CI 12120, CI 12370, CI 12420, CI 12490, CI 14700, CI 15525, CI 15580, CI 15620, CI 15630, CI 15800, CI 15850, CI 15865, CI 15880, CI 17200, CI 26100, CI 45380, CI 45410, CI 58000, CI 73360, CI 73915 and/or CI 75470.

The organic pigment can also be a color paint. As contemplated herein, the term color varnish is understood to mean particles comprising a layer of absorbed dyes, the unit of particle and dye being insoluble under the above conditions. The particles can, for example, be inorganic substrates, which can be aluminum, silica, calcium borosilate, calcium aluminum borosilicate or even aluminum.

For example, alizarin color varnish can be used.

Due to their excellent resistance to light and temperature, the use of the pigments in the compositions as contemplated herein is particularly preferred. It is also preferred if the pigments used have a certain particle size. This particle size leads on the one hand to an even distribution of the pigments in the formed polymer film and on the other hand avoids a rough hair or skin feeling after application of the cosmetic product. As contemplated herein, it is therefore advantageous if the at least one pigment has an average particle size D50 of from about 1.0 to about 50 μm, preferably about 5.0 to about 45 μm, preferably about 10 to about 40 μm, about 14 to about 30 μm. The mean particle size $D_{50}$, for example, can be determined using dynamic light scattering (DLS).

In a further preferred embodiment, a process as contemplated herein is exemplified in that the agent (a) contains—based on the total weight of the agent (a)—one or more pigments in a total amount of from about 0.01 to about 10.0% by weight, preferably from about 0.1 to about 8.0% by weight, more preferably from about 0.2 to about 6.0% by weight and very particularly preferably from about 0.5 to about 4.5% by weight.

As colorant compound(s) (a2), the agents (a) used in the process as contemplated herein may also contain one or more direct dyes. Direct-acting dyes are dyes that draw directly onto the hair and do not require an oxidative process to form the color. Direct dyes are usually nitrophenylene diamines, nitroaminophenols, azo dyes, anthraquinones, triarylmethane dyes or indophenols.

The direct dyes within the meaning of the present disclosure have a solubility in water (760 mmHg) at 25° C. of more than 0.5 g/L and are therefore not to be regarded as pigments.

Preferably, the direct dyes within the meaning of the present disclosure have a solubility in water (760 mmHg) at 25° C. of more than 1.0 g/L.

Direct dyes can be divided into anionic, cationic, and non-ionic direct dyes.

In a further preferred embodiment, a process as contemplated herein is exemplified in that the agent (a) comprises at least one anionic, cationic and/or nonionic direct dye as the coloring compound (a2).

In a further preferred embodiment, a process as contemplated herein is exemplified in that the agent (a) comprises at least one colorant compound (a2) from the group of anionic, nonionic, and/or cationic direct dyes.

Suitable cationic direct dyes include Basic Blue 7, Basic Blue 26, Basic Violet 2, and Basic Violet 14, Basic Yellow 57, Basic Red 76, Basic Blue 16, Basic Blue 347 (Cationic Blue 347/Dystar), HC Blue No. 16, Basic Blue 99, Basic Brown 16, Basic Brown 17, Basic Yellow 57, Basic Yellow 87, Basic Orange 31, Basic Red 51 Basic Red 76

As non-ionic direct dyes, non-ionic nitro and quinone dyes and neutral azo dyes can be used. Suitable non-ionic direct dyes are those listed under the international designations or Trade names HC Yellow 2, HC Yellow 4, HC Yellow 5, HC Yellow 6, HC Yellow 12, HC Orange 1, Disperse Orange 3, HC Red 1, HC Red 3, HC Red 10, HC Red 11, HC Red 13, HC Red BN, HC Blue 2, HC Blue 11, HC Blue 12, Disperse Blue 3, HC Violet 1, Disperse Violet 1, Disperse Violet 4, Disperse Black 9 known compounds, as well as 1,4-diamino-2-nitrobenzene, 2-amino-4-nitrophenol, 1,4-bis-(2-hydroxyethyl)-amino-2-nitrobenzene, 3-nitro-4-(2-hydroxyethyl)-aminophenol 2-(2-hydroxyethyl)amino-4,6-dinitrophenol, 4-[(2-hydroxyethyl)amino]-3-nitro-1-methylbenzene, 1-amino-4-(2-hydroxyethyl)-amino-5-chloro-2-nitrobenzene, 4-amino-3-nitrophenol, 1-(2'-ureidoethyl) amino-4-nitrobenzene, 2-[(4-amino-2-nitrophenyl)amino] benzoic acid, 6-nitro-1,2,3,4-tetrahydroquinoxaline, 2-hydroxy-1,4-naphthoquinone, picramic acid and its salts, 2-amino-6-chloro-4-nitrophenol, 4-ethylamino-3-nitrobenzoic acid and 2-chloro-6-ethylamino-4-nitrophenol.

In the course of the work leading to the present invention, it has been found that dyeing's of particularly high color intensity can be produced with agents (a) containing at least one anionic direct dye.

In an explicitly quite particularly preferred embodiment, a process as contemplated herein is therefore exemplified in that the agent (a) comprises at least one anionic direct dye.

Anionic direct dyes are also called acid dyes. Acid dyes are direct dyes that have at least one carboxylic acid group (—COOH) and/or one sulphonic acid group (—$SO_3$H). Depending on the pH value, the protonated forms (—COOH, —$SO_3$H) of the carboxylic acid or sulphonic acid groups are in equilibrium with their deprotonated forms (—$OO^-$, —$SO_3^-$— present). The proportion of protonated forms increases with decreasing pH. If direct dyes are used in the form of their salts, the carboxylic acid groups or sulphonic acid groups are present in deprotonated form and are neutralized with corresponding stoichiometric equivalents of cations to maintain electro neutrality. Inventive acid dyes can also be used in the form of their sodium salts and/or their potassium salts.

The acid dyes within the meaning of the present disclosure have a solubility in water (760 mmHg) at 25° C. of more than 0.5 g/L and are therefore not to be regarded as pigments. Preferably the acid dyes within the meaning of the present disclosure have a solubility in water (760 mmHg) at 25° C. of more than 1.0 g/L.

The alkaline earth salts (such as calcium salts and magnesium salts) or aluminum salts of acid dyes often have a lower solubility than the corresponding alkali salts. If the solubility of these salts is below 0.5 g/L (25° C., 760 mmHg), they do not fall under the definition of a direct dye.

An essential characteristic of acid dyes is their ability to form anionic charges, whereby the carboxylic acid or sulphonic acid groups responsible for this are usually linked to different chromophoric systems. Suitable chromophoric systems can be found, for example, in the structures of nitrophenylenediamines, nitroaminophenols, azo dyes, anthraquinone dyes, triarylmethane dyes, xanthene dyes, rhodamine dyes, oxazine dyes and/or indophenol dyes.

In one embodiment, a process for dyeing keratinous material is thus preferred, which is exemplified in that the composition (a) comprises at least one anionic direct dye selected from the group of nitrophenylenediamines, nitroaminophenols, azo dyes, anthraquinone dyes, triarylmethane dyes, xanthene dyes, rhodamine dyes, oxazine dyes and/or indophenol dyes, the xanthene dyes, the rhodamine dyes, the oxazine dyes and/or the indophenol dyes, the dyes from the abovementioned group each having at least one carboxylic acid group (—COOH), a sodium carboxylate group (—COONa), a potassium carboxylate group (—COOK), a sulfonic acid group (—$SO_3H$), a sodium sulfonate group (—$SO_3Na$) and/or a potassium sulfonate group (—$SO_3K$).

For example, one or more compounds from the following group can be selected as particularly well suited acid dyes: Acid Yellow 1 (D&C Yellow 7, Citronin A, Ext. D&C Yellow No. 7, Japan Yellow 403, CI 10316, COLIPA no B001), Acid Yellow 3 (COLIPA no: C 54, D&C Yellow No 10, Quinoline Yellow, E104, Food Yellow 13), Acid Yellow 9 (CI 13015), Acid Yellow 17 (CI 18965), Acid Yellow 23 (COLIPA no C. 29, Covacap Jaune W 1100 (LCW), Sicovit Tartrazine 85 E 102 (BASF), Tartrazine, Food Yellow 4, Japan Yellow 4, FD&C Yellow No. 5), Acid Yellow 36 (CI 13065), Acid Yellow 121 (CI 18690), Acid Orange 6 (CI 14270), Acid Orange 7 (2-Naphthol orange, Orange II, CI 15510, D&C Orange 4, COLIPA no $C_{015}$), Acid Orange 10 (C.I. 16230; Orange G sodium salt), Acid Orange 11 (CI 45370), Acid Orange 15 (CI 50120), Acid Orange 20 (CI 14600), Acid Orange 24 (BROWN 1; CI 20170; KATSU201; nosodiumsalt; Brown No. 201; RESORCIN BROWN; ACID ORANGE 24; Japan Brown 201; D & C Brown No. 1), Acid Red 14 (C.I. 14720), Acid Red 18 (E124, Red 18; CI 16255), Acid Red 27 (E 123, CI 16185, C-Rot 46, Echtrot D, FD&C Red Nr.2, Food Red 9, Naphtholrot S), Acid Red 33 (Red 33, Fuchsia Red, D&C Red 33, CI 17200), Acid Red 35 (CI C.I. 18065), Acid Red 51 (CI 45430, Pyrosin B, Tetraiodfluorescein, Eosin J, Iodeosin), Acid Red 52 (CI 45100, Food Red 106, Solar Rhodamine B, Acid Rhodamine B, Red no 106 Pontacyl Brilliant Pink), Acid Red 73 (CI 27290), Acid Red 87 (Eosin, CI 45380), Acid Red 92 (COLIPA no C53, CI 45410), Acid Red 95 (CI 45425, Erythtosine, Simacid Erythrosine Y), Acid Red 184 (CI 15685), Acid Red 195, Acid Violet 43 (Jarocol Violet 43, Ext. D&C Violet no 2, C.I. 60730, COLIPA no C063), Acid Violet 49 (CI 42640), Acid Violet 50 (CI 50325), Acid Blue 1 (Patent Blue, CI 42045), Acid Blue 3 (Patent Blue V, CI 42051), Acid Blue 7 (CI 42080), Acid Blue 104 (CI 42735), Acid Blue 9 (E 133, Patent blue AE, Amidoblau AE, Erioglaucin A, CI 42090, C.I. Food Blue 2), Acid Blue 62 (CI 62045), Acid Blue 74 (E 132, CI 73015), Acid Blue 80 (CI 61585), Acid Green 3 (CI 42085, Foodgreen1), Acid Green 5 (CI 42095), Acid Green 9 (C.I.42100), Acid Green 22 (C.I.42170), Acid Green 25 (CI 61570, Japan Green 201, D&C Green No. 5), Acid Green 50 (Brilliant Acid Green BS, C.I. 44090, Acid Brilliant Green BS, E 142), Acid Black 1 (Black no 401, Naphthalene Black 10B, Amido Black 10B, CI 20 470, COLIPA no B15), Acid Black 52 (CI 15711), Food Yellow 8 (CI 14270), Food Blue 5, D&C Yellow 8, D&C Green 5, D&C Orange 10, D&C Orange 11, D&C Red 21, D&C Red 27, D&C Red 33, D&C Violet 2 and/or D&C Brown 1.

For example, the water solubility of anionic direct dyes can be determined in the following way. 0.1 g of the anionic direct dye is placed in a beaker. A stir-fish is added. Then add 100 ml of water. This mixture is heated to 25° C. on a magnetic stirrer while stirring. It is stirred for 60 minutes. The aqueous mixture is then visually assessed. If there are still undissolved residues, the amount of water is increased—for example in steps of 10 ml. Water is added until the amount of dye used is completely dissolved. If the dye-water mixture cannot be assessed visually due to the high intensity of the dye, the mixture is filtered. If a proportion of undissolved dyes remains on the filter paper, the solubility test is repeated with a higher quantity of water. If 0.1 g of the anionic direct dye dissolves in 100 ml water at 25° C., the solubility of the dye is 1.0 g/L.

Acid Yellow 1 is called 8-hydroxy-5,7-dinitro-2-naphthalenesulfonic acid disodium salt and has a solubility in water of at least 40 g/L (25° C.).

Acid Yellow 3 is a mixture of the sodium salts of mono- and sisulfonic acids of 2-(2-quinolyl)-1H-indene-1,3 (2H)-dione and has a water solubility of 20 g/L (25° C.).

Acid Yellow 9 is the disodium salt of 8-hydroxy-5,7-dinitro-2-naphthalenesulfonic acid, its solubility in water is above 40 g/L (25° C.).

Acid Yellow 23 is the trisodium salt of 4,5-dihydro-5-oxo-1-(4-sulfophenyl)-4-((4-sulfophenyl)azo)-1H-pyrazole-3-carboxylic acid and is highly soluble in water at 25° C.

Acid Orange 7 is the sodium salt of 4-[(2-hydroxy-1-naphthyl)azo]benzene sulphonate. Its water solubility is more than 7 g/L (25° C.).

Acid Red 18 is the trinatirum salt of 7-hydroxy-8-[(E)-(4-sulfonato-1-naphthyl)-diazenyl)]-1,3-naphthalene disulfonate and has a very high-water solubility of more than 20% by weight.

Acid Red 33 is the diantrium salt of 5-amino-4-hydroxy-3-(phenylazo)-naphthalene-2,7-disulphonate, its solubility in water is 2.5 g/L (25° C.).

Acid Red 92 is the disodium salt of 3,4,5,6-tetrachloro-2-(1,4,5,8-tetrabromo-6-hydroxy-3-oxoxanthen-9-yl) benzoic acid, whose solubility in water is indicated as greater than 10 g/L (25° C.).

Acid Blue 9 is the disodium salt of 2-({4-[N-ethyl(3-sulfonatobenzyl]amino]phenyl}{4-[(N-ethyl(3-sulfonatobenzyl)imino]-2,5-cyclohexadien-1-ylidene}methyl)-benzenesulfonate and has a solubility in water of more than 20% by weight (25° C.).

A very particularly preferred method as contemplated herein is therefore exemplified in that, in that the composition (a) comprises at least one coloring compound (a2) from the group of anionic direct dyes selected from the group of A Acid Yellow 1, Acid Yellow 3, Acid Yellow 9, Acid Yellow 17, Acid Yellow 23, Acid Yellow 36, Acid Yellow 121, Acid Orange 6, Acid Orange 7, Acid Orange 10, Acid Orange 11, Acid Orange 15, Acid Orange 20, Acid Orange 24, Acid Red 14, Acid Red, Acid Red 27, Acid Red 33, Acid Red 35, Acid Red 51, Acid Red 52, Acid Red 73, Acid Red 87, Acid Red 92, Acid Red 95, Acid Red 184, Acid Red 195, Acid Violet 43, Acid Violet 49, Acid Violet 50, Acid Blue 1, Acid Blue 3, Acid Blue 7, Acid Blue 104, Acid Blue 9, Acid Blue 62, Acid Blue 74, Acid Blue 80, Acid Green 3, Acid Green 5, Acid Green 9, Acid Green 22, Acid Green 25, Acid Green 50, Acid Black 1, Acid Black 52, Food Yellow 8, Food Blue 5, D&C Yellow 8, D&C Green 5, D&C Orange 10, D&C Orange 11, D&C Red 21, D&C Red 27, D&C Red 33, D&C Violet 2 and/or D&C Brown 1.

The direct dye(s), in the anionic direct dyes, can be used in different amounts in the medium (a) depending on the desired color intensity. Particularly good results were obtained when the agent (a) contains—based on its total weight—one or more direct dyes (a2) in a total amount of from about 0.01 to about 10.0% by weight, preferably from about 0.1 to about 8.0% by weight, more preferably from about 0.2 to about 6.0% by weight and very particularly preferably from about 0.5 to about 4.5% by weight.

In a further preferred embodiment, a process as contemplated herein is exemplified in that the agent (a) contains—based on the total weight of the agent (a)—one or more direct dyes (a2) in a total amount of from about 0.01 to about 10.0% by weight, preferably from about 0.1 to about 8.0% by weight, more preferably from about 0.2 to about 6.0% by weight and very preferably from about 0.5 to about 4.5% by weight.

Silicone Polymers (a3)

In another very particularly preferred embodiment, the agent (a) used in the process as contemplated herein additionally contains at least one silicone polymer (a3).

Silicone polymers, which can alternatively be called silicones for short, are understood to be poly(organo)siloxanes. Silicone polymers are a group of synthetic polymers in which silicon atoms are linked via oxygen atoms.

Silicone polymers are generally macromolecules with a molecular weight of at least 500 g/mol, preferably at least 1000 g/mol, more preferably at least 2500 g/mol, particularly preferably at least 5000 g/mol, which comprise repeating organic units.

The maximum molecular weight of the silicone polymer depends on the degree of polymerization (number of polymerized monomers) and the batch size and is partly determined by the polymerization method. For the purposes of the present invention, it is preferred if the maximum molecular weight of the silicone polymer is not more than $10^7$ g/mol, preferably not more than $10^6$ g/mol, and particularly preferably not more than $10^5$ g/mol.

The silicone polymers comprise many Si—O repeating units, and the Si atoms may carry organic radicals such as alkyl groups or substituted alkyl groups.

Corresponding to the high molecular weight of silicone polymers, these are based on more than 10 Si—O repeat units, preferably more than 50 Si—O repeat units, and more preferably more than 100 Si—O repeat units, most preferably more than 500 Si—O repeat units.

The silicone polymers (a3) contained in agent (a) are therefore different from the silanes (a1) also contained in agent (a).

In the context of one embodiment, a method for dyeing keratinous material is thus preferred, which is exemplified in that the agent comprises (a):

(a3) at least one silicone polymer.

In the work leading to the present invention, it was found that incorporation of the silicone polymer (a3) into the agent (a) resulted in an improvement in hair feel.

The film produced by the oligomerization or polymerization of the organosilicon compounds (silanes) (a1) may exhibit a certain stickiness or even softness, especially when higher amounts of silanes (a1) are used, which may have a negative effect on the feel of the keratin materials on the one hand and on the durability of the film on the other. Without being committed to this theory, it is believed that the joint application of the silane (a1) and the silicone polymer (a3) in the medium (a) leads to a reaction or interaction of the two components with each other. When silane and silicone polymer are used together, the silanes appear to form a film, as previously described, into which the silicone polymers are either incorporated, or to which the silicone polymers agglomerate. It has been found that the film formed in this way is much more supple, flexible, durable, and less brittle.

Accordingly, it was observed that the rheological properties of the film produced by agent (a) could be greatly improved by the addition of at least one silicone polymer (a3). In the presence of the silicone polymers (a3), the film became firmer or more rigid, leaving the colored keratin materials with a less sticky, smoother, and more pleasing appearance. Furthermore, the higher strength of the film also had positive effects on the fastness properties of the keratin materials, especially on their rub fastness properties. Since the dyed films were more resistant when in contact with combs, brushes, and textiles, they showed less abrasion when in contact with these items.

When certain silicone polymers (a3) were used, the advantages described above were particularly pronounced. It has therefore been found to be particularly preferred if the agents (a) used in the process as contemplated herein contain at least one alkoxy-modified silicone polymer and/or at least one amino-modified silicone polymer (a3).

In the context of one embodiment, a method for dyeing keratinous material is thus preferred, which is exemplified in that the agent comprises (a):

(a3) at least one alkoxy-modified and/or amino-modified silicone polymer.

In a further preferred embodiment, a process as contemplated herein is exemplified in that the agent (a) comprises at least one alkoxy-modified silicone polymer.

Alkoxy-modified silicones are silicones whose structure includes at least one structural alkoxy unit. This structural alkoxy unit can be, for example, an alkoxy group. Alkoxy groups are understood to be $C_2$-$C_{10}$ alkoxy groups. The alkoxy group may be terminal to the silicone (i.e., present, for example, as the group —O—$CH_3$ or as the group —O—$CH_2$—$CH_3$). However, it is equally as contemplated herein if the alkoxy group itself still carries a substituent; in this case, an alkoxy modification is understood to be at least one grouping located on the silicone such as, for example, (—CH2-CH2-O—), (—CH2-CH2-CH2-O—), (—CH(CH3)-CH2-O—), (—CH2-CH(CH3)-CH2-O—) or (—CH2-CH2-CH2-CH2-O—). Preferably, the alkoxy-modified silicones (A) as contemplated herein carry at least one grouping (—CH2-CH2-O—) and/or (—CH2-CH2-CH2-O—).

The alkoxy groups may be linked to the silicone either via a carbon atom or via an oxygen atom, for example, the silicones may bear the structural units of the formula (S-a), (S-b), (S-c) and/or (S-d):

(Si-a)

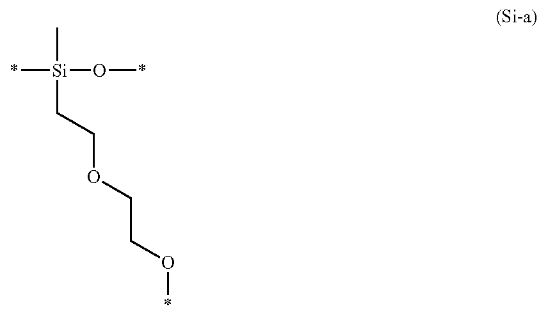

-continued

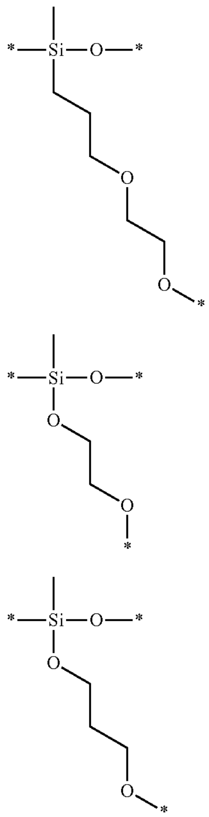

It is particularly preferred if the alkoxy-modified silicone polymer(s) (a3) carry more than one alkoxy group, i.e., if the silicone polymers (a3) are polyalkoxylated. Polyalkoxylated silicones carry as structural units polyoxyalkylene groups, polyoxyethylene groups (i.e., groups of the type [—$CH_2$—$CH_2$—O-]$_m$) and/or poloxypropylene groups (i.e., groups of the type [—CH(CH3)-CH2-O-]$_m$ and/or [—CH2-CH2-CH2-O-]$_m$). Preferably, the number of polyoxyalkylene units in the silicone polymer is at least 2. m is therefore an integer greater than or equal to 2.

Particularly preferably, the alkoxy-modified silicone (a3) is a nonionic silicone. Non-ionic silicones carry neither positive nor negative charges.

Very particularly suitable polyalkoxylated silicones (a3) comprise at least one structural unit of the formula (S-I)

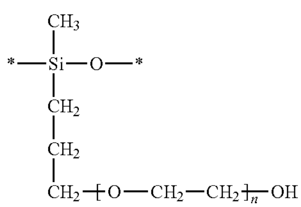

wherein n is an integer from about 2 to about 20, preferably an integer from about 4 to about 18, more preferably an integer from about 6 to about 16, still more preferably an integer from about 8 to about 14, and most preferably the number 12.

The positions marked with an asterisk * in the above formulas represent the free valences of the corresponding bonds, whereby the bond can be to a further Si atom, a further O atom and/or a further C atom.

In the context of one embodiment, a method for dyeing keratinous material is thus preferred, which is exemplified in that the agent comprises (a):

(a3) at least one silicone polymer comprising at least one structural unit of formula (S-I)

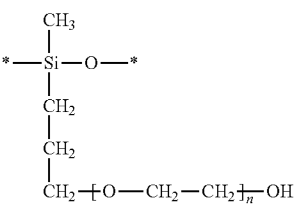

wherein n is an integer from about 2 to about 20, preferably an integer from about 4 to about 18, more preferably an integer from about 6 to about 16, still more preferably an integer from about 8 to about 14, and most preferably the number 12.

A preferred alkoxy-modified silicone polymer (a3) may contain, in addition to one or more structural units of the general formula (S-I), further structural units that differ structurally from the units of formula (S-I). Particularly preferably, the alkoxy-modified silicone polymer additionally comprises one or more dimethylsiloxane units. Depending on whether the silicone of the present disclosure is linear or branched, it has two (in the case of a chain linear silicone) or more (in the case of a branched silicone) end groups. It has been found to be particularly advantageous if a silicone polymer (a3) as contemplated herein has a trimethylsilyloxy group (i.e., a group —O—$Si(CH_3)_3$) as end groups in each case.

In another very particularly preferred embodiment, a process as contemplated herein is therefore exemplified in that the agent (a) comprises at least one silicone polymer (a3) which is composed of structural units of the formula (S-I), the formula (S-II), the formula (S-III) and the formula (S-IV),

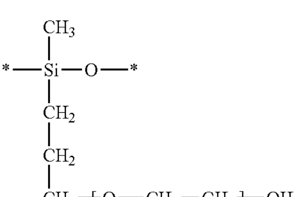

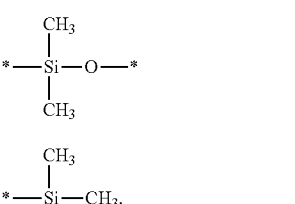

-continued (S-IV)

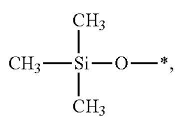

wherein n—independently in each structural unit (S-I)—represents in each case an integer from about 2 to about 20, preferably an integer from about 4 to about 18, more preferably an integer from about 6 to about 16, still more preferably an integer from about 8 to about 14, and most preferably the number 12.

A silicone polymer (a3) composed of structural units of the formula (S-I), the formula (S-II), the formula (S-III) and the formula (S-IV) is understood in this context to mean a silicone which exclusively possesses (in each case one or more) structural units of the formulae (S-I), (S-II), (S-III) and (S-IV). Here, the silicone can also contain different structural units of the formula (S-I), each of which is distinguished by its number n.

The positions marked with an asterisk in the structural units each represent the linkage points to the other structural units. For example, a very particularly preferred silicone polymer (a3) composed of structural units of formula (S-I), formula (S-II), formula (S-III) and formula (S-IV) may have the following structure:

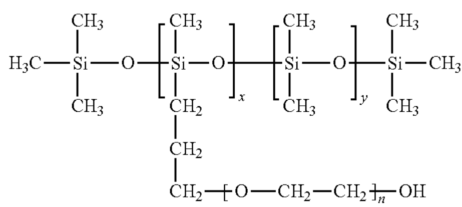

x and y are chosen here depending on the desired molecular weight of the silicone, and n represents one of the preferred or particularly preferred integers described above as contemplated herein.

Both low molecular weight and higher molecular weight alkoxy-modified silicones can be used as silicone polymers (a3). Particularly beneficial effects were observed for silicone polymers (a3) with a molar mass of about 800 to about 10 000 g/mol, preferably of about 1 000 to about 9 000 g/mol, further preferably of about 2 000 to about 8 000 g/mol and especially preferably of about 2 500 to about 5 000 g/mol.

Particularly well-suited silicone polymers include:

Abil B 8843 by the company Evonic, PEG-14 DIMETHICONE

Xiameter OFX 0193 Fluid by the company Dow Corning, PEG-12 Dimethicone

Furthermore, particularly good results were also obtained when an agent (a) containing an amino-modified silicone polymer (a3) was used in the process as contemplated herein. The amino-modified silicone polymer may alternatively be referred to as an amino-functionalized silicone polymer or also as an aminosilicone.

In another preferred embodiment, a process as contemplated herein is exemplified in that the agent (a) comprises at least one amino-modified silicone polymer.

Agent (a) may contain one or more different amino-modified silicone polymers (a3). Such silicones can be exemplified, for example, by the formula (S-V)

$$M(R_aQ_bSiO_{(4-a-b)/2})_x(R_cSiO_{(4-c)/2})_yM \quad \text{(S-V)}$$

in which formula above R is a hydrocarbon or a hydrocarbon radical having from 1 to about 6 carbon atoms, Q is a polar radical of the general formula $—R^1HZ$ wherein $R^1$ is a divalent linking group bonded to hydrogen and the radical Z composed of carbon and hydrogen atoms, carbon, hydrogen and oxygen atoms, or carbon, hydrogen and nitrogen atoms, and Z is an organic amino functional radical containing at least one amino functional group; "a" takes values ranging from about 0 to about 2, "b" takes values ranging from about 1 to about 3, "a"+"b" is less than or equal to 3, and "c" is a number ranging from about 1 to about 3, and x is a number ranging from about 1 to about 2.000, preferably from about 3 to about 50 and most preferably from about 3 to about 25, and y is a number in the range of from about 20 to about 10,000, preferably from about 125 to about 10,000 and most preferably from about 150 to about 1,000, and M is a suitable silicone end group as known in the prior art, preferably trimethylsiloxy. Non-limiting examples of radicals represented by R include alkyl radicals, such as methyl, ethyl, propyl, isopropyl, isopropyl, butyl, isobutyl, amyl, isoamyl, hexyl, isohexyl and the like; alkenyl radicals, such as vinyl, halovinyl, alkylvinyl, allyl, haloallyl, alkylallyl; cycloalkyl radicals, such as cyclobutyl, cyclopentyl, cyclohexyl and the like; phenyl radicals, benzyl radicals, halohydrocarbon radicals, such as 3-chloropropyl, 4-bromobutyl, 3,3,3-trifluoropropyl, chlorocyclohexyl, bromophenyl, chlorophenyl and the like, and sulfur-containing radicals, such as mercaptoethyl, mercaptopropyl, mercaptohexyl, mercaptophenyl and the like; preferably R is an alkyl radical containing from 1 to about 6 carbon atoms, and most preferably R is methyl. Examples of $R^1$ include methylene, ethylene, propylene, hexamethylene, decamethylene, $—CH_2CH(CH_3)CH_2—$, phenylene, naphthylene, $—CH_2CH_2SCH_2CH_2—$, $—CH_2CH_2OCH_2—$, $—OCH_2CH_2—$, $—OCH_2CH_2CH_2—CH_2CH(CH_3)C(O)OCH_2—$, $—(CH_2)_3CC(O)OCH_2CH_2—$, $—C_6H_4C_6H_4—$, $—C_6H_4CH_2C_6H_4—$; and $—(CH_2)_3C(O)SCH_2CH_2—$.

Z is an organic amino functional residue containing at least one amino functional group. One possible formula for Z is $NH(CH_2)_zNH_2$, where z is 1 or more. Another possible formula for Z is $—NH(CH_2)_z(CH_2)_{zz}NH$, wherein both z and zz are independently 1 or more, this structure comprising diamino ring structures, such as piperazinyl. Z is most preferably an $—NHCH_2CH_2NH_2$ residue. Another possible formula for Z is $—N(CH_2)_z(CH_2)_{zz}NX_2$ or $—NX_2$, wherein each X of $X_2$ is independently selected from the group of hydrogen and alkyl groups having 1 to 12 carbon atoms, and zz is 0.

Q is most preferably a polar, amine-functional radical of the formula $—CH_2CH_2CH_2NHCH_2CH_2NH_2$. In the formulas, "a" takes values ranging from about 0 to about 2, "b" takes values ranging from about 2 to about 3, "a"+"b" is less than or equal to 3, and "c" is a number ranging from about 1 to about 3. The molar ratio of $R_aQ_bSiO_{(4-a-b)/2}$ units to $R_cSiO_{(4-c)/2}$ units is in the range of about 1:2 to about 1:65, preferably from about 1:5 to about 1:65 and most preferably by about 1:15 to about 1:20. If one or more silicones of the above formula are used, then the various variable substituents in the above formula may be different for the various silicone components present in the silicone mixture.

In a particularly preferred embodiment, a method as contemplated herein is exemplified by the application of an agent (a) to the keratinous material, wherein the agent (a) is an amino-modified silicone polymer (a3) of formula (S-VI)

$$R'_aG_{3-a}\text{-}Si(OSiG_2)_n\text{-}(OSiG_bR'_{2-b})_m—O—SiG_{3-a}\text{-}R'_a \quad \text{(S-VI)},$$

wherein:

G is —H, a phenyl group, OH, —O—$CH_3$, —$CH_3$, —O—$CH_2CH_3$, —$CH_2CH_3$, —O—$CH_2CH_2CH_3$, —$CH_2CH_2CH_3$, —O—$CH(CH_3)_2$, —$CH(CH_3)_2$, —O—$CH_2CH_2CH_2CH_3$, $CH_2CH_2CH_2CH_3$, —O—$CH_2CH(CH_3)_2$, —$CH_2CH(CH_3)_2$, —O—CH $(CH_3)CH_2CH_3$, $CH(CH_3)CH_2CH_3$, —O—$C(CH_3)_3$, —$C(CH_3)_3$.

a stands for a number between 0 and 3, especially 0.

b stands for a number between 0 and 1, especially 1, m and n are numbers whose sum (m+n) is between 1 and 2000, preferably between 50 and 150, where n preferably assumes values from 0 to 1999 and from 49 to 149 and m preferably assumes values from 1 to 2000, from 1 to 10, R is a monovalent radical selected from

-Q-N(R")—$CH_2$—$CH_2$—$N(R")_2$

-Q-$N(R")_2$

-Q-$N^+(R")_3A^-$

-Q-$N^+H(R")_2A^-$

-Q-$N^+H_2(R")A^-$

-Q-N(R")—$CH_2$—$CH_2$—$N^+R"H_2A^-$, where each Q is a chemical bond, —$CH_2$—, —$CH_2$—$CH_2$—, —$CH_2CH_2CH_2$—, —$C(CH_3)_2$—, —$CH_2CH_2CH_2CH_2$—, —$CH_2C(CH_3)_2$—, —$CH(CH_3)CH_2CH_2$—

R" represents identical or different radicals selected from the group of —H, -phenyl, -benzyl, —$CH_2$—$CH(CH_3)Ph$, the $C_{1-20}$ alkyl radicals, preferably —$CH_3$, —$CH_2CH_3$, —$CH_2CH_2CH_3$, —$CH(CH_3)_2$, —$CH_2CH_2CH_2H_3$, —$CH_2CH(CH_3)_2$, —$CH(CH_3)CH_2CH_3$, —$C(CH_3)_3$, and A represents an anion preferably selected from chloride, bromide, iodide or methosulfate.

In another preferred embodiment, a method as contemplated herein is exemplified by the application of an agent (a) to the keratinous material, wherein the agent (a) comprises at least one amino-modified silicone polymer (a3) of formula (S-VII), (S-VII)

$$(CH_3)_3Si\text{-}[O\text{-}Si(CH_3)_2]_n[OSi(CH_3)]_m\text{-}OSi(CH_3)_3$$

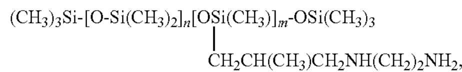

wherein m and n are numbers whose sum (m+n) is between 1 and 2000, preferably between about 50 and 150, n preferably assuming values from about 0 to about 1999 and from about 49 to about 149, and m preferably assuming values from about 1 to about 2000, from about 1 to about 10.

According to the INCI declaration, these silicones are called trimethylsilylamodimethicones.

In a further preferred embodiment, a method as contemplated herein is exemplified by the application of an agent (a) to the keratinous material, said agent (a) comprising at least one amino-modified silicone polymer (a3) of formula (S-VIII)

(S-VIII)

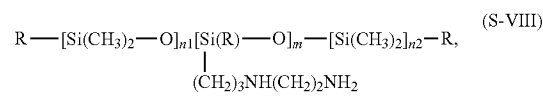

in which R represents —OH, —O—$CH_3$ or a —$CH_3$ group and m, n1 and n2 are numbers whose sum (m+n1+n2) is between about 1 and 2000, preferably between about 50 and 150, the sum (n1+n2) preferably assuming values from about 0 to about 1999 and from about 49 to about 149 and m preferably assuming values from about 1 to about 2000, from about 1 to about 10.

According to the INCI declaration, these amino-modified or amino-functionalized silicone polymers are known as amodimethicones.

Regardless of which amino-modified silicones are used, agents (a) as contemplated herein are preferred which contain an amino-modified silicone polymer whose amine number is above 0.25 meq/g, preferably above 0.3 meq/g and above 0.4 meq/g. The amine number represents the milliequivalents of amine per gram of the amino-functional silicone. The amine number represents the milliequivalents of amine per gram of the amino-functional silicone.

In another preferred embodiment, a method as contemplated herein is exemplified by the application of an agent (a) to the keratinous material, wherein the agent (a) comprises at least one amino-modified silicone polymer (a3) of the formula of formula (S-IX), (S-IX)

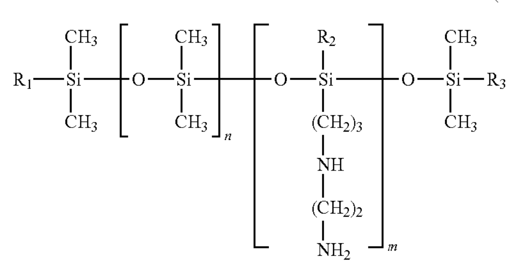

where m and n mean numbers chosen so that the sum (n+m) is in the range 1 to 1000, n is a number in the range 0 to 999 and m is a number in the range 1 to 1000, R1, R2 and R3, which are the same or different, denote a hydroxy group or a C1-4 alkoxy group, wherein at least one of R1 to R3 represents a hydroxy group.

Other preferred methods as contemplated herein are exemplified by the application of an agent (a) to the keratinous material, said agent (a) comprising at least amino-functional silicone polymer of the formula of formula (S-X)

(S-X)

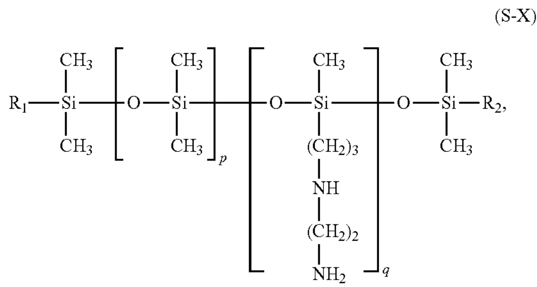

in which p and q mean numbers chosen so that the sum (p+q) is in the range 1 to 1000, p is a number in the range 0 to 999 and q is a number in the range 1 to 1000, R1 and R2, which are different, denote a hydroxy group or a C1-4 alkoxy group, at least one of R1 to R2 denoting a hydroxy group.

The silicones of the formulas (S-IX) and (S-X) differ in the grouping at the Si atom carrying the nitrogen-containing group: In formula (S-IX), R2 represents a hydroxy group or a C1-4 alkoxy group, while the residue in formula (S-X) is a methyl group. The individual Si groupings, which are marked with the indices m and n or p and q, do not have to be present as blocks; rather, the individual units can also be present in a statistically distributed manner, i.e., in the formulas (S-IX) and (S-X), not every R1-$Si(CH_3)_2$ group is necessarily bound to an —[O—$Si(CH_3)_2$] grouping.

Processes as contemplated herein in which an agent (a) containing at least one amino-modified silicone polymer (a3) of the formula of the formula (S-XI) is applied to the keratin fibers have also proved to be particularly effective with respect to the desired effects.

(S-XI)

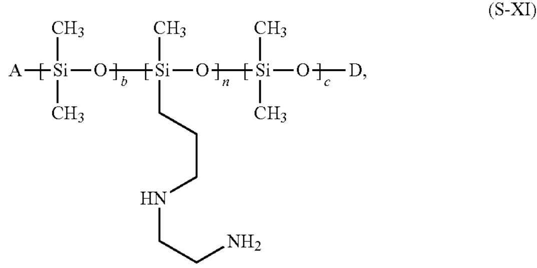

located in the

A represents a group —OH, —O—$Si(CH_3)_3$, —O—Si$(CH_3)_2OH$, —O—$Si(CH_3)_2OCH_3$, D represents a group —H, —$Si(CH_3)_3$, —$Si(CH_3)_2OH$, —$Si(CH_3)_2OCH_3$, b, n, and c stand for integers between 0 and 1000, with the specifications n>0 and b+c>0 at least one of the conditions A=—OH or D=—H is fulfilled.

In the above formula (S-XI), the individual siloxane units are statistically distributed with the indices b, c, and n, i.e., they do not necessarily have to be block copolymers.

Particularly good effects about the improvement of the rub fastness could be observed when in the processes as contemplated herein an agent (a) was applied to the keratin material, which contained a special 4-morpholinomethyl-substituted silicone polymer (a3). This very particularly preferred amino-functionalized silicone polymer comprises at least one structural unit of the formula (S-XIII)

(S-XIII)

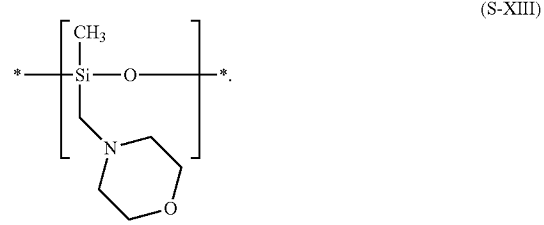

In the context of one embodiment, a method for dyeing keratinous material is thus preferred, which is exemplified in that the agent comprises (a):

(a3) at least one silicone polymer comprising at least one structural unit of the formula (S-XIII)

(S-XIII)

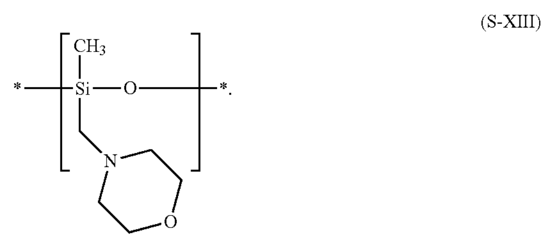

Particularly good effects in terms of improving rub fastness were also observed when an agent (a) containing a special 4-morpholinomethyl-substituted silicone polymer (a3) was applied to the keratin material in the processes as contemplated herein. This very particularly preferred amino-functionalized silicone polymer comprises structural units of the formulae (S-XII) and of the formula (S-XIII)

(S-XII)

(S-XIII)

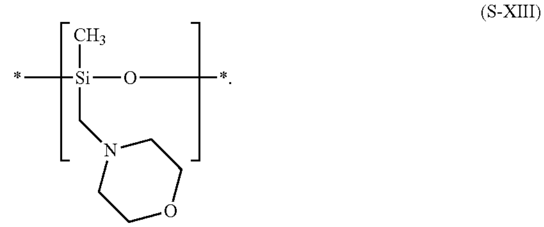

In an explicitly quite particularly preferred embodiment, a process as contemplated herein is exemplified in that the agent (a) contains at least one amino-modified silicone polymer (a3) which comprises structural units of the formula (S-XII) and of the formula (S-XIII)

(S-XII)

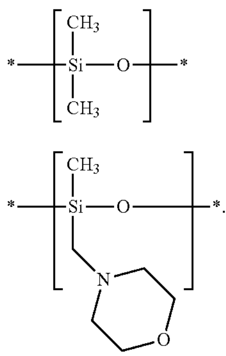

(S-XIII)

Corresponding 4-morpholinomethyl-substituted silicone polymers are described below.

A very particularly preferred amino-functionalized silicone polymer is known by the name of Amodimethicone/Morpholinomethyl Silsesquioxane Copolymer is known and commercially available from Wacker in the form of the raw material Belsil ADM 8301 E.

As a 4-morpholinomethyl-substituted silicone, for example, a silicone can be used which has structural units of the formulae (S-XII), (S-XIII') and (S-XIV')

(S-XII)

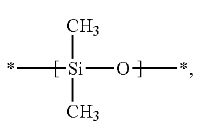

(S-XIV')

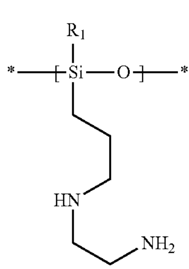

-continued (S-XIII')

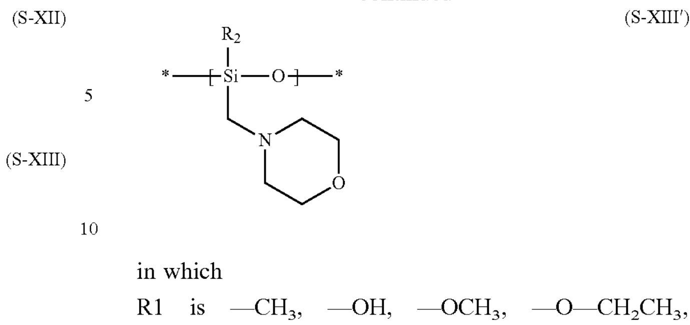

in which

R1 is $—CH_3$, —OH, $—OCH_3$, $—O—CH_2CH_3$, $—O—CH_2CH_2CH_3$, or $—O—CH(CH_3)_2$;

R2 is $—CH_3$, —OH, or $—OCH_3$.

Particularly preferred compositions (a) as contemplated herein contain at least one 4-morpholinomethyl-substituted silicone of the formula (S-XV)

(S-V)

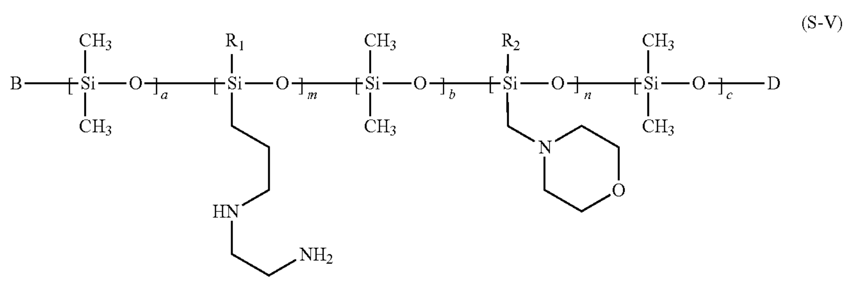

located in the

R1 is $—CH_3$, —OH, $—OCH_3$, $—O—CH_2CH_3$, $—O—CH_2CH_2CH_3$, or $—O—CH(CH_3)_2$;

R2 is $—CH_3$, —OH, or $—OCH_3$.

B represents a group —OH, $—O—Si(CH_3)_3$, $—O—Si(CH_3)_2OH$, $—O—Si(CH_3)_2OCH_3$, D represents a group —H, $—Si(CH_3)_3$, $—Si(CH_3)_2OH$, $—Si(CH_3)_2OCH_3$, a, b, and c stand independently for integers between 0 and 1000, with the condition a+b+c>0 m and n independently of each other stand for integers between 1 and 1000 with the proviso that at least one of the conditions B=—OH or D=—H is fulfilled, the units a, b, c, m, and n are distributed statistically or blockwise in the molecule.

Structural formula (Si-VI) is intended to illustrate that the siloxane groups n and m do not necessarily have to be directly bonded to a terminal grouping B or D, respectively. Rather, in preferred formulas (Si-VI) a>0 or b>0 and in particularly preferred formulas (Si-VI) a>0 and c>0, i.e., the terminal grouping B or D is preferably attached to a dimethylsiloxy grouping. Also, in formula (Si-VI), the siloxane units a, b, c, m, and n are preferably statistically distributed.

The silicones used as contemplated herein represented by formula (Si-VI) can be trimethylsilyl-terminated (D or B=—Si(CH3)3), but they can also be dimethylsilylhydroxy-terminated on two sides or dimethylsilylhydroxy-terminated and dimethylsilylmethoxy-terminated on one side. Silicones particularly preferred in the context of the present disclosure are selected from silicones in which.

$B=—O—Si(CH_3)_2OH$ and $D=—Si(CH_3)_3$ $B=—O—Si(CH_3)_2OH$ and $D=—Si(CH_3)_2OH$ B=—O—$Si(CH_3)_2OH$ and D=—$Si(CH_3)_2OCH_3$
B=—O—$Si(CH_3)_3$ and D=—$Si(CH_3)_2OH$
B=—O—$Si(CH_3)_2OCH_3$ and D=—$Si(CH_3)_2OH$
to everyone.

To produce particularly resistant films, the agent (a) contains the silicone polymer(s), in the alkoxy-modified and/or the amino-modified silicone polymers, preferably in specific ranges of amounts.

Particularly flexible films of low tack were obtained when an agent (a) was used in the process as contemplated herein which contains—based on the total weight of the agent (a)—one or more silicone polymers (a3) in a total amount of from about 0.1 to about 8.0% by weight, preferably from about 0.1 to about 5.0% by weight, more preferably from about 0.1 to about 3.0% by weight and very preferably from about 0.1 to about 0.5% by weight.

In the context of a further preferred embodiment, a process as contemplated herein is exemplified in that the agent (a) contains—based on the total weight of the agent (a)—one or more silicone polymers in a total amount of from about 0.1 to about 15.0% by weight, preferably from about 0.5 to about 12.0% by weight, more preferably from about 1.0 to about 10.0% by weight and very particularly preferably from about 2.0 to about 8.0% by weight.

In an explicitly quite particularly preferred embodiment, a process as contemplated herein is exemplified in that the agent (a) contains—based on the total weight of the agent (a)—one or more alkoxy-modified silicone polymers in a total amount of from about 0.1 to about 15.0% by weight, preferably from about 0.5 to about 12.0% by weight, more preferably from about 1.0 to about 10.0% by weight and very particularly preferably from about 2.0 to about 8.0% by weight.

In an explicitly quite particularly preferred embodiment, a process as contemplated herein is exemplified in that the agent (a) contains—based on the total weight of the agent (a)—one or more amino-modified silicone polymers in a total amount of from about 0.1 to about 15.0% by weight, preferably from about 0.5 to about 12.0% by weight, more preferably from about 1.0 to about 10.0% by weight and very particularly preferably from about 2.0 to about 8.0% by weight.

pH Value of the Agent (a)

It has been found preferable if the agent (a) is made up in the form of a water-containing agent adjusted to an alkaline pH.

To adjust the pH value, the agent (a) may contain at least one alkalizing agent.

To adjust the desired pH, the agents (a) may therefore also contain at least one alkalizing agent. The pH values for the purposes of the present disclosure are pH values measured at a temperature of 22° C.

As alkalizing agent, agent (a) may contain, for example, ammonia, alkanolamines and/or basic amino acids.

The alkanolamines which can be used in the composition of the present disclosure are preferably selected from primary amines having a $C_2$-$C_6$ alkyl base which carries at least one hydroxyl group. Preferred alkanolamines are selected from the group formed by 2-aminoethan-1-ol (monoethanolamine), 3-aminopropan-1-ol, 4-aminobutan-1-ol, 5-aminopentan-1-ol, 1-aminopropan-2-ol, 1-aminobutan-2-ol, 1-aminopentan-2-ol, 1-aminopentan-3-ol, 1-aminopentan-4-ol, 3-amino-2-methylpropan-1-ol, 1-amino-2-methylpropan-2-ol, 3-aminopropan-1,2-diol, 2-amino-2-methylpropan-1,3-diol.

Alkanolamines particularly preferred as contemplated herein are selected from 2-aminoethan-1-ol and/or 2-amino-2-methylpropan-1-ol. A particularly preferred embodiment is therefore exemplified in that the agent as contemplated herein contains an alkanolamine selected from 2-aminoethan-1-ol and/or 2-amino-2-methylpropan-1-ol as alkalizing agent.

A particularly preferred embodiment is therefore exemplified in that the agent as contemplated herein contains an alkanolamine selected from 2-aminoethan-1-ol and/or 2-amino-2-methylpropan-1-ol as alkalizing agent. Preferred amino acids are amino carboxylic acids, especially α-(alpha)-amino carboxylic acids and ω-amino carboxylic acids, whereby α-amino carboxylic acids are particularly preferred.

As contemplated herein, basic amino acids are those amino acids which have an isoelectric point pI of greater than 7.0.

Basic α-amino carboxylic acids contain at least one asymmetric carbon atom. In the context of the present invention, both possible enantiomers can be used equally as specific compounds or their mixtures, especially as racemates. However, it is particularly advantageous to use the naturally preferred isomeric form, usually in L-configuration.

The basic amino acids are preferably selected from the group formed by arginine, lysine, ornithine, and histidine, especially preferably arginine and lysine. In another particularly preferred embodiment, an agent as contemplated herein is therefore exemplified in that the alkalizing agent is a basic amino acid from the group arginine, lysine, ornithine and/or histidine.

In addition, the product may contain other alkalizing agents, especially inorganic alkalizing agents. Inorganic alkalizing agents usable as contemplated herein are preferably selected from the group formed by sodium hydroxide, potassium hydroxide, calcium hydroxide, barium hydroxide, sodium phosphate, potassium phosphate, sodium silicate, sodium metasilicate, potassium silicate, sodium carbonate and potassium carbonate.

Particularly preferred alkalizing agents are ammonia, 2-aminoethan-1-ol (monoethanolamine), 3-aminopropan-1-ol, 4-aminobutan-1-ol, 5-aminopentan-1-ol, 1-aminopropan-2-ol, 1-aminobutan-2-ol, 1-aminopentan-2-ol, 1-aminopentan-3-ol, 1-aminopentan-4-ol, 3-amino-2-methylpropan-1-ol, 1-Amino-2-methylpropan-2-ol, 3-aminopropan-1,2-diol, 2-amino-2-methylpropan-1,3-diol, arginine, lysine, ornithine, histidine, sodium hydroxide, potassium hydroxide, calcium hydroxide, barium hydroxide, sodium phosphate, potassium phosphate, sodium silicate, sodium metasilicate, potassium silicate, sodium carbonate and potassium carbonate.

Although the agents (a) as contemplated herein are preferably adjusted to pH values in the alkaline range, it may nevertheless be necessary in principle to also use acidifiers in small amounts for fine adjustment of the desired pH value. Acidifiers suitable as contemplated herein are, for example, citric acid, lactic acid, acetic acid or also dilute mineral acids (such as hydrochloric acid, sulfuric acid, phosphoric acid).

However, in the course of the work leading to the present invention, it has been found that the presence of the alkalizing agent or the adjustment of the alkaline pH is essential for the formation of resistant films on the keratin material. The presence of excessive amounts of acids can have a negative effect on the strength of the films. For this reason, it has proved preferable to keep the quantities of acids used in the medium (a) as low as possible. For this reason, it is advantageous if the total amount of organic and/or inorganic acids contained in the agent (a) does not exceed a certain value.

In a further preferred embodiment, a process as contemplated herein is exemplified in that the total amount of organic acids from the group of citric acid, tartaric acid, malic acid, and lactic acid contained in the agent (a) is below 1.0% by weight, preferably below 0.7% by weight, more preferably below 0.5% by weight, even more preferably below 0.1% by weight and very particularly preferably below 0.01% by weight.

In a further preferred embodiment, a process as contemplated herein is exemplified in that the total amount of inorganic acids from the group of hydrochloric acid, sulfuric acid and phosphoric acid contained in the agent (a) is below 1.0% by weight, preferably below 0.7% by weight, more preferably below 0.5% by weight, still more preferably below 0.1% by weight and very particularly preferably below 0.01% by weight.

The maximum total amounts of the acids contained in the agent (a) given above are always based on the total weight of the agent (a).

Agent (b)

The method of treating keratin material as contemplated herein comprises, in addition to the application of agent (a), the application of agent (b). The agent (b) is exemplified in that it comprises at least one film-forming polymer (b1).

Polymers are macromolecules with a molecular weight of at least 1000 g/mol, preferably of at least 2500 g/mol, particularly preferably of at least 5000 g/mol, which include identical, repeating organic units. The polymers of the present disclosure may be synthetically produced polymers which are manufactured by polymerization of one type of monomer or by polymerization of different types of monomer which are structurally different from each other. If the polymer is produced by polymerizing a type of monomer, it is called a homo-polymer. If structurally different monomer types are used in polymerization, the resulting polymer is called a copolymer.

The maximum molecular weight of the polymer depends on the degree of polymerization (number of polymerized monomers) and the batch size and is determined by the polymerization method. For the purposes of the present invention, it is preferred that the maximum molecular weight of the film-forming hydrophobic polymer (c) is not more than $10^7$ g/mol, preferably not more than $10^6$ g/mol and particularly preferably not more than $10^5$ g/mol.

As contemplated herein, a film-forming polymer is a polymer which can form a film on a substrate, for example on a keratinic material or a keratinic fiber. The formation of a film can be demonstrated, for example, by looking at the keratin material treated with the polymer under a microscope.

The film-forming polymers (b1) in the agent (b) can be hydrophilic or hydrophobic.

In a first embodiment, it may be preferred to use at least one hydrophobic film-forming polymer in agent (b).

A hydrophobic polymer is a polymer that has a solubility in water at 25° C. (760 mmHg) of less than 1% by weight.

The water solubility of the film-forming, hydrophobic polymer can be determined in the following way, for example. 1.0 g of the polymer is placed in a beaker. Make up to 100 g with water. A stir-fish is added, and the mixture is heated to 25° C. on a magnetic stirrer while stirring. It is stirred for 60 minutes. The aqueous mixture is then visually assessed. If the polymer-water mixture cannot be assessed visually due to a high turbidity of the mixture, the mixture is filtered. If a proportion of undissolved polymer remains on the filter paper, the solubility of the polymer is less than 1% by weight.

These include acrylic acid-type polymers, polyurethanes, polyesters, polyamides, polyurea's, cellulose polymers, nitrocellulose polymers, silicone polymers, acrylamide-type polymers, and polyisoprenes.

Particularly well suited film-forming, hydrophobic polymers are, for example, polymers from the group of copolymers of acrylic acid, copolymers of methacrylic acid, homopolymers or copolymers of acrylic acid esters, homopolymers or copolymers of methacrylic acid esters, homopolymers or copolymers of acrylic acid amides, homopolymers or copolymers of methacrylic acid amides, copolymers of vinylpyrrolidone, copolymers of vinyl alcohol, copolymers of vinyl acetate, homopolymers or copolymers of ethylene, homopolymers or copolymers of propylene, homopolymers or copolymers of styrene, polyurethanes, polyesters and/or polyamides.

In a further preferred embodiment, an agent as contemplated herein is exemplified in that it contains at least one film-forming hydrophobic polymer (c) selected from the group of copolymers of acrylic acid, copolymers of methacrylic acid, homopolymers or copolymers of acrylic acid esters, homopolymers or copolymers of methacrylic acid esters, homopolymers or copolymers of acrylic acid amides, homopolymers or copolymers of methacrylic acid amides, copolymers of vinylpyrrolidone, copolymers of vinyl alcohol, copolymers of vinyl acetate, homopolymers or copolymers of ethylene, homopolymers or copolymers of propylene, homopolymers or copolymers of styrene, polyurethanes, polyesters and/or polyamides.

The film-forming hydrophobic polymers, which are selected from the group of synthetic polymers, polymers obtainable by radical polymerization or natural polymers, have proved to be particularly suitable for solving the problem as contemplated herein.

Other particularly well-suited film-forming hydrophobic polymers can be selected from the homopolymers or copolymers of olefins, such as cycloolefins, butadiene, isoprene or styrene, vinyl ethers, vinyl amides, the esters, or amides of (meth)acrylic acid having at least one $C_1$-$C_{20}$ alkyl group, an aryl group or a $C_2$-$C_{10}$ hydroxyalkyl group.

Other film-forming hydrophobic polymers may be selected from the homo- or copolymers of isooctyl (meth) acrylate; isononyl (meth)acrylate; 2-ethylhexyl (meth) acrylate; lauryl (meth)acrylate; isopentyl (meth)acrylate; n-butyl (meth)acrylate); isobutyl (meth)acrylate; ethyl (meth)acrylate; methyl (meth)acrylate; tert-butyl (meth) acrylate; stearyl (meth)acrylate; hydroxyethyl (meth)acrylate; 2-hydroxypropyl (meth)acrylate; 3-hydroxypropyl (meth)acrylate and/or mixtures thereof.

Other film-forming hydrophobic polymers may be selected from the homo- or copolymers of (meth)acrylamide; N-alkyl-(meth)acrylamides, in those with C2-C18 alkyl groups, such as N-ethyl-acrylamide, N-tert-butyl-acrylamide, le N-octyl-crylamide; N-di(C1-C4)alkyl-(meth)acrylamide.

Other preferred anionic copolymers are, for example, copolymers of acrylic acid, methacrylic acid or their $C_1$-$C_6$ alkyl esters, as they are marketed under the INCI Declaration Acrylates Copolymers. A suitable commercial product is for example Aculyn® 33 from Rohm & Haas. Copolymers of acrylic acid, methacrylic acid or their $C_1$-$C_6$ alkyl esters and the esters of an ethylenically unsaturated acid and an alkoxylated fatty alcohol are also preferred. Suitable ethylenically unsaturated acids are especially acrylic acid, methacrylic acid and itaconic acid; suitable alkoxylated fatty alcohols are especially steareth-20 or ceteth-20.

Very particularly preferred polymers on the market are, for example, Aculyn® 22 (Acrylates/Steareth-20 Me-thacrylate Copolymer), Aculyn® 28 (Acrylates/Beheneth-25 Methacrylate Copolymer), Structure 20010 (Acryla-tes/Steareth-20 Itaconate Copolymer), Structure 30010 (Acrylates/Ceteth-20 Itaconate Copolymer), Structure Plus® (Acrylates/Aminoacrylates C10-30 Alkyl PEG-20 Itaconate Copolymer), Carbopol® 1342, 1382, Ultrez 20, Ultrez 21 (Acrylates/C10-30 Alkyl Acrylate Crosspolymer), Synthalen W 2000® (Acrylates/Palmeth-25 Acrylate Copolymer) or the Rohme and Haas distributed Soltex OPT (Acrylates/C12-22 Alkyl methacrylate Copolymer).

The homo- and copolymers of N-vinylpyrrolidone, vinylcaprolactam, vinyl-(C1-$C_6$)alkyl-pyrrole, vinyl-oxazole, vinyl-thiazole, vinylpyrimidine, vinylimidazole can be named as suitable polymers based on vinyl monomers.

Furthermore, the copolymers octylacrylamide/acrylates/butylaminoethyl-methacrylate copolymer, as commercially marketed under the trade names AMPHOMER® or LOVOCRYL® 47 by NATIONAL STARCH, or the copolymers of acrylates/octylacrylamides marketed under the trade names DERMACRYL® LT and DERMACRYL® 79 by NATIONAL STARCH are particularly suitable.

Suitable olefin-based polymers include homopolymers and copolymers of ethylene, propylene, butene, isoprene and butadiene.

In another embodiment, the film-forming hydrophobic polymers may be the block copolymers comprising at least one block of styrene or the derivatives of styrene. These block copolymers can be copolymers that contain one or more other blocks in addition to a styrene block, such as styrene/ethylene, styrene/ethylene/butylene, styrene/butylene, styrene/isoprene, styrene/butadiene. Such polymers are commercially distributed by BASF under the trade name "Luvitol HSB".

Surprisingly, it was found that particularly intense and washfast colorations could be obtained when agent (b) contained at least one film-forming polymer (b1) selected from the group of acrylic acid homopolymers and copolymers, methacrylic acid homopolymers and copolymers, acrylic acid ester homopolymers and copolymers, methacrylic acid ester homopolymers and copolymers, homopolymers and copolymers of acrylic acid amides, homopolymers and copolymers of methacrylic acid amides, homopolymers and copolymers of vinylpyrrolidone, homopolymers and copolymers of vinyl alcohol, homopolymers and copolymers of vinyl acetate, homopolymers and copolymers of ethylene, homopolymers and copolymers of propylene, homopolymers and copolymers of styrene, polyurethanes, polyesters and polyamides.

In a further preferred embodiment, a process as contemplated herein is exemplified in that the agent (b) comprises at least one film-forming polymer (b1) which is selected from the group of the homopolymers and copolymers of acrylic acid, the homopolymers and copolymers of methacrylic acid, the homopolymers and copolymers of acrylic acid esters, the homopolymers and copolymers of methacrylic acid esters homopolymers and copolymers of acrylic acid amides, homopolymers and copolymers of methacrylic acid amides, homopolymers and copolymers of vinylpyrrolidone, homopolymers and copolymers of vinyl alcohol, homopolymers and copolymers of vinyl acetate, homopolymers and copolymers of ethylene, homopolymers and copolymers of propylene, homopolymers and copolymers of styrene, polyurethanes, polyesters and polyamides.

In a further embodiment, it may be preferred to use at least one hydrophilic film-forming polymer (b1) in the agent (b).

A hydrophilic polymer is a polymer that has a solubility in water at 25° C. (760 mmHg) of more than 1% by weight, preferably more than 2% by weight.

The water solubility of the film-forming, hydrophilic polymer can be determined in the following way, for example. 1.0 g of the polymer is placed in a beaker. Make up to 100 g with water. A stir-fish is added, and the mixture is heated to 25° C. on a magnetic stirrer while stirring. It is stirred for 60 minutes. The aqueous mixture is then visually assessed. A completely dissolved polymer appears markoscopically homogeneous. If the polymer-water mixture cannot be assessed visually due to a high turbidity of the mixture, the mixture is filtered. If no undissolved polymer remains on the filter paper, the solubility of the polymer is more than 1% by weight.

Nonionic, anionic, and cationic polymers can be used as film-forming, hydrophilic polymers.

Suitable film-forming hydrophilic polymers can be selected, for example, from the group of polyvinylpyrrolidone (co)polymers, polyvinyl alcohol (co)polymers, vinyl acetate (co)polymers, carboxyvinyl (co)polymers, acrylic acid (co)polymers, methacrylic acid (co)polymers, natural gums, polysaccharides and/or acrylamide (co)polymers.

Furthermore, it is particularly preferred to use polyvinylpyrrolidone (PVP) and/or a vinylpyrrolidone-containing copolymer as film-forming hydrophilic polymer.

In another particularly preferred embodiment, an agent as contemplated herein is exemplified in that it contains (c) at least one film-forming, hydrophilic polymer selected from the group of polyvinylpyrrolidone (PVP) and the copolymers of polyvinylpyrrolidone.

It is further preferred if the agent as contemplated herein contains polyvinylpyrrolidone (PVP) as the film-forming hydrophilic polymer. Surprisingly, the wash fastness of the dyeing's obtained with agents containing PVP (b9 was also particularly good.

Particularly well-suited polyvinylpyrrolidones are available, for example, under the name Luviskol® K from BASF SE, especially Luviskol® K 90 or Luviskol® K 85 from BASF SE.

The polymer PVP K30, which is marketed by Ashland (ISP, POI Chemical), can also be used as another explicitly very well suited polyvinylpyrrolidone (PVP). PVP K 30 is a polyvinylpyrrolidone which is highly soluble in cold water and has the CAS number 9003-39-8. The molecular weight of PVP K 30 is about 40000 g/mol.

Other particularly suitable polyvinylpyrrolidones are the substances known under the trade names LUVITEC K 17, LUVITEC K 30, LUVITEC K 60, LUVITEC K 80, LUVITEC K 85, LUVITEC K 90 and LUVITEC K 115 and available from BASF.

The use of film-forming hydrophilic polymers (b1) from the group of copolymers of polyvinylpyrrolidone has also led to particularly good and washfast color results.

Vinylpyrrolidone-vinyl ester copolymers, such as those marketed under the trademark Luviskol® (BASF), are particularly suitable film-forming hydrophilic polymers. Luviskol VA 64 and Luviskol VA 73, both vinylpyrrolidone/vinyl acetate copolymers, are particularly preferred nonionic polymers.

Of the vinylpyrrolidone-containing copolymers, a styrene/VP copolymer and/or a vinylpyrrolidone-vinyl acetate copolymer and/or a VP/DMAPA acrylates copolymer and/or a VP/vinyl caprolactam/DMAPA acrylates copolymer are particularly preferred in cosmetic compositions.

Vinylpyrrolidone-vinyl acetate copolymers are marketed under the name Luviskol® VA by BASF SE. For example, a VP/Vinyl Caprolactam/DMAPA Acrylates copolymer is sold under the trade name Aquaflex® SF-40 by Ashland Inc. For example, a VP/DMAPA acrylates copolymer is marketed by Ashland under the name Styleze CC-10 and is a highly preferred vinylpyrrolidone-containing copolymer.

Other suitable copolymers of polyvinylpyrrolidone may also be those obtained by reacting N-vinylpyrrolidone with at least one further monomer from the group of V-vinylformamide, vinyl acetate, ethylene, propylene, acrylamide, vinylcaprolactam, vinylcaprolactone and/or vinyl alcohol.

In another very particularly preferred embodiment, an agent as contemplated herein is exemplified in that it comprises at least one film-forming, hydrophilic polymer (b1) selected from the group of polyvinylpyrrolidone (PVP), vinylpyrrolidone/vinyl acetate copolymers, vinylpyrrolidone/styrene copolymers, vinylpyrrolidone/ethylene copolymers, vinylpyrrolidone/propylene copolymers, vinylpyrrolidone/vinylcaprolactam copolymers, vinylpyrrolidone/vinylformamide copolymers and/or vinylpyrrolidone/vinyl alcohol copolymers.

Another fussy copolymer of vinylpyrrolidone is the polymer known under the INCI designation maltodextrin/VP copolymer.

Furthermore, intensively dyed keratin material, especially hair, with particularly good wash fastness could be obtained if a non-ionic, film-forming, hydrophilic polymer was used as the film-forming, hydrophilic polymer.

In another embodiment, the agent (b) may contain at least one nonionic, film-forming, hydrophilic polymer (b1).

As contemplated herein, a non-ionic polymer is understood to be a polymer which in a protic solvent—such as water—under standard conditions does not carry structural units with permanent cationic or anionic groups, which must be compensated by counterions while maintaining electron neutrality. Cationic groups include quaternized ammonium groups but not protonated amines Anionic groups include carboxylic and sulphonic acid groups.

Preference is given to products containing, as a non-ionic, film-forming, hydrophilic polymer, at least one polymer selected from the group of

- Polyvinylpyrrolidone,
- Copolymers of N-vinylpyrrolidone and vinyl esters of carboxylic acids having 2 to 18 carbon atoms, of N-vinylpyrrolidone and vinyl acetate,
- Copolymers of N-vinylpyrrolidone and N-vinylimidazole and methacrylamide,
- Copolymers of N-vinylpyrrolidone and N-vinylimidazole and acrylamide,
- Copolymers of N-vinylpyrrolidone with N,N-di(C1 to C4)-alkylamino-(C2 to C4)-alkylacrylamide, If copolymers of N-vinylpyrrolidone and vinyl acetate are used, it is again preferable if the molar ratio of the structural units contained in the monomer N-vinylpyrrolidone to the structural units of the polymer contained in the monomer vinyl acetate is in the range from about 20:80 to about 80:20, in particular from about 30:70 to about 60:40. Suitable copolymers of vinyl pyrrolidone and vinyl acetate are available, for example, under the trademarks Luviskol® VA 37, Luviskol® VA 55, Luviskol® VA 64 and Luviskol® VA 73 from BASF SE.

Another particularly preferred polymer is selected from the INCI designation VP/Methacrylamide/Vinyl Imidazole Copolymer, which is available under the trade name Luviset Clear from BASF SE.

Another particularly preferred non-ionic, film-forming, hydrophilic polymer is a copolymer of N-vinylpyrrolidone and N,N-dimethylaminiopropylmethacrylamide, which is sold under the INCI designation VP/DMAPA Acrylates Copolymer e.g., under the trade name Styleze® CC 10 by ISP.

A cationic polymer of interest is the copolymer of N-vinylpyrrolidone, N-vinylcaprolactam, N-(3-dimethylaminopropyl)methacrylamide and 3-(methacryloylamino)propyllauryl-dimethylammonium chloride (INCI designation): Polyquaternium-69), which is marketed, for example, under the trade name AquaStyle® 300 (28-32% by weight active substance in ethanol-water mixture, molecular weight 350000) by ISP.

Other suitable film-forming, hydrophilic polymers include.

- Vinylpyrrolidone-vinylimidazolium methochloride copolymers, as offered under the designations Luviquat® FC 370, FC 550 and the INCI designation Polyquaternium-16 as well as FC 905 and HM 552,
- Vinylpyrrolidone-vinylcaprolactam-acrylate terpolymers, as they are commercially available with acrylic acid esters and acrylic acid amides as a third monomer component, for example under the name Aquaflex® SF 40.

Polyquaternium-11 is the reaction product of diethyl sulphate with a copolymer of vinyl pyrrolidone and dimethylaminoethyl methacrylate. Suitable commercial products are available under the names Dehyquart® CC 11 and Luviquat® PQ 11 PN from BASF SE or Gafquat 440, Gafquat 734, Gafquat 755 or Gafquat 755N from Ashland Inc.

Polyquaternium-46 is the reaction product of vinylcaprolactam and vinylpyrrolidone with methylvinylimidazolium methosulfate and is available for example under the name Luviquat® Hold from BASF SE. Polyquaternium-46 is preferably used in an amount of 1 to 5% by weight—based on the total weight of the cosmetic composition. It particularly prefers to use polyquaternium-46 in combination with a cationic guar compound. It is even highly preferred that polyquaternium-46 is used in combination with a cationic guar compound and polyquaternium-11.

Suitable anionic film-forming, hydrophilic polymers can be, for example, acrylic acid polymers, which can be in non-crosslinked or crosslinked form. Such products are sold commercially under the trade names Carbopol 980, 981, 954, 2984 and 5984 by Lubrizol or under the names Synthalen M and Synthalen K by 3V Sigma (The Sun Chemicals, Inter Harz).

Examples of suitable film-forming, hydrophilic polymers from the group of natural gums are xanthan gum, gellan gum, carob gum.

Examples of suitable film-forming hydrophilic polymers from the group of polysaccharides are hydroxyethyl cellulose, hydroxypropyl cellulose, ethyl cellulose and carboxymethyl cellulose.

Suitable film-forming, hydrophilic polymers from the group of acrylamdes are, for example, polymers which are produced from monomers of (methy)acrylamido-$C_1$-$C_4$-alkyl sulphonic acid or the salts thereof. Corresponding polymers may be selected from the polymers of polyacrylamidomethanesulfonic acid, polyacrylamidoethanesulfonic acid, polyacrylamidopropanesulfonic acid, poly2-acrylamido-2-methylpropanesulfonic acid, poly-2-methylacrylamido-2-methylpropanesulfonic acid and/or poly-2-methylacrylamido-n-butanesulfonic acid.

Preferred polymers of the poly(meth)arylamido-C1-C4-alkyl sulphonic acids are cross-linked and at least 90% neutralized. These polymers can or cannot be cross-linked.

Cross-linked and fully or partially neutralized polymers of the poly-2-acrylamido-2-methylpropane sulfonic acid type are available under the INCI designation "Ammonium Polyacrylamido-2-methyl-propanesulphonates" or "Ammonium Polyacryldimethyltauramides".

Another preferred polymer of this type is the cross-linked poly-2-acrylamido-2-methyl-propanesulphonic acid polymer marketed by Clamant under the trade name Hostacerin AMPS, which is partially neutralized with ammonia.

In a further explicitly quite particularly preferred embodiment, a process as contemplated herein is exemplified in that the agent (b) comprises at least one anionic, film-forming, polymer (b1).

In this context, the best results were obtained when the agent (b) contains at least one film-forming polymer (b1) comprising at least one structural unit of formula (P-I) and at least one structural unit of formula (P-II)

$$*-\!\!\left[CH_2-\underset{COOM}{\underset{|}{CH}}\right]\!\!-* \qquad \text{(P-I)}$$

$$*-\!\!\left[CH_2-CH_2\right]\!\!-*, \qquad \text{(P-II)}$$

where

M is a hydrogen atom or ammonium ($NH_4$), sodium, potassium, ½ magnesium or ½ calcium.

In a further preferred embodiment, a process as contemplated herein is exemplified in that the agent (b) comprises at least one film-forming polymer (b1) which comprises at least one structural unit of the formula (P-I) and at least one structural unit of the formula (P-II)

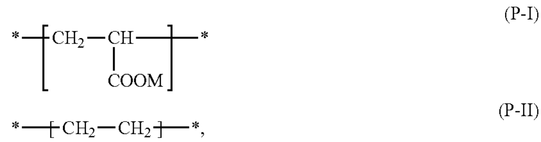

where

M is a hydrogen atom or ammonium ($NH_4$), sodium, potassium, ½ magnesium or ½ calcium.

When M represents a hydrogen atom, the structural unit of the formula (P-I) is based on an acrylic acid unit.

When M stands for an ammonium counterion, the structural unit of the formula (P-I) is based on the ammonium salt of acrylic acid.

When M stands for a sodium counterion, the structural unit of the formula (P-I) is based on the sodium salt of acrylic acid.

When M stands for a potassium counterion, the structural unit of the formula (P-I) is based on the potassium salt of acrylic acid.

If M stands for a half equivalent of a magnesium counterion, the structural unit of the formula (P-I) is based on the magnesium salt of acrylic acid.

If M stands for a half equivalent of a calcium counterion, the structural unit of the formula (P-I) is based on the calcium salt of acrylic acid.

The film-forming polymer or polymers (b1) as contemplated herein are preferably used in certain ranges of amounts in the agent (b) as contemplated herein. In this context, it has proved particularly preferable for solving the problem as contemplated herein if the agent (b) contains—based on the total weight of the agent (b)—one or more film-forming polymers (b1) in a total amount of from about 0.1 to about 18.0% by weight, preferably from about 1.0 to about 16.0% by weight, more preferably from about 5.0 to about 14.5% by weight and very particularly preferably from about 8.0 to about 12.0% by weight.

In a further preferred embodiment, a process as contemplated herein is exemplified in that the agent (b) contains—based on the total weight of the agent (b)—one or more film-forming polymers (b1) in a total amount of from about 0.1 to about 18.0% by weight, preferably from about 1.0 to about 16.0% by weight, more preferably from about 5.0 to about 14.5% by weight and very particularly preferably from about 8.0 to about 12.0% by weight.

The application of agent (b) is intended to seal and fix the film initially produced by the application of agent (a). Here, the film produced by agent (b) is preferably not colored itself. In this way, the uncolored film produced by agent (b) is above the colored film produced by agent (a) and can protect the latter from external influences. In this way, it can also be ensured that any abrasion of the second film (b) that takes place to a certain extent does not lead to any color changes in the entire film system. It is therefore particularly preferred if the agent (b) contains no or only exceedingly small amounts of colorant compounds.

In a further preferred embodiment, a process as contemplated herein is exemplified in that the total amount of colorant compounds from the group of pigments and direct dyes contained in the agent (b) is below 0.2% by weight, preferably below 0.1% by weight, even more preferably below 0.05% by weight and very particularly preferably below 0.01% by weight.

The total amount of colorant compounds from the group of pigments and direct dyes is based on the total weight of the formulation (b).

Other Ingredients

The agents (a) and (b) used in the process described above may further contain one or more additional optional ingredients.

The products may also contain one or more surfactants. The term surfactants refer to surface-active substances. A distinction is made between anionic surfactants of a hydrophobic residue and a negatively charged hydrophilic head group, amphoteric surfactants, which carry both a negative and a compensating positive charge, cationic surfactants, which in addition to a hydrophobic residue have a positively charged hydrophilic group, and non-ionic surfactants, which have no charges but strong dipole moments and are strongly hydrated in aqueous solution.

Zwitterionic surfactants are those surface-active compounds which carry at least one quaternary ammonium group and at least one $—COO^{(-)}—$ or $—SO_3^{(-)}$ group in the molecule. Particularly suitable zwitterionic surfactants are the so-called betaines such as the N-alkyl-N,N-dimethylammonium-glycinate, for example the cocoalkyl-dimethylammoniumglycinate, N-acylaminopropyl-N,N-dimethylammoniumglycinate, for example, cocoacylaminopropyl dimethyl ammonium glycinate, and 2-alkyl-3-carboxymethyl-3-hydroxyethyl imidazolines each having 8 to 18 C atoms in the alkyl or acyl group, and cocoacylaminoethyl hydroxyethyl carboxymethyl glycinate. A preferred zwitterionic surfactant is the fatty acid amide derivative known under the INCI name cocamidopropyl betaine.

Ampholytic surfactants are surface-active compounds which, apart from a $C_8$-$C_{24}$ alkyl or acyl group, contain at least one free amino group and at least one —COOH— or —$SO_3H$ group in the molecule and can form internal salts. Examples of suitable ampholytic surfactants are N-alkylglycines, N-alkylpropionic acids, N-alkylaminobutyric acids, N-alkyliminodipropionic acids, N-hydroxyethyl-N-alkylamidopropylglycines, N-alkyltaurines, N-alkylsarcosines, 2-alkylaminopropionic acids and alkylaminoacetic acids each with about 8 to 24 C atoms in the alkyl group. Typical examples of amphoteric or zwitterionic surfactants are alkylbetaines, alkylamidobetaines, amino propionates, aminoglycinate, imidazoliniumbetaines and sulfobetaines.

Particularly preferred ampholytic surfactants are N-cocoalkylaminopropionate, cocoacylaminoethylaminopropionate and $C_{12}$-$C_{18}$ acylsarcosine.

The products may also additionally contain at least one non-ionic surfactant. Suitable non-ionic surfactants are alkyl polyglycosides as well as alkylene oxide addition products to fatty alcohols and fatty acids with 2 to 30 mol ethylene oxide per mol fatty alcohol or fatty acid. Preparations with good properties are also obtained if they contain as non-ionic surfactants fatty acid esters of ethoxylated glycerol reacted with at least 2 mol ethylene oxide. The non-ionic surfactants are used in a total quantity of about 0.1 to about 45% by weight, preferably about 1 to about 30% by weight and very preferably about 1 to about 15% by weight—based on the total weight of the respective agent.

In addition, the products may also contain at least one cationic surfactant. Cationic surfactants are surfactants, i.e., surface-active compounds, each with one or more positive charges. Cationic surfactants contain only positive charges. Usually, these surfactants are composed of a hydrophobic part and a hydrophilic head group, the hydrophobic part usually of a hydrocarbon backbone (e.g., of one or two linear or branched alkyl chains) and the positive charge(s) being in the hydrophilic head group. Examples of cationic surfactants are:

- quaternary ammonium compounds which, as hydrophobic radicals, may carry one or two alkyl chains with a chain length of 8 to 28 C atoms,
- quaternary phosphonium salts substituted with one or more alkyl chains with a chain length of 8 to 28 C atoms or
- tertiary sulfonium salts.

Furthermore, the cationic charge can also be part of a heterocyclic ring (e.g., an imidazolium ring or a pyridinium ring) in the form of an onium structure. In addition to the functional unit carrying the cationic charge, the cationic surfactant may also contain other uncharged functional groups, as is the case for example with esterquats. The cationic surfactants are used in a total quantity of about 0.1 to about 45 wt. %, preferably about 1 to about 30 wt. % and most preferably about 1 to about 15 wt. %—based on the total weight of the respective agent.

Furthermore, the compositions as contemplated herein may also contain at least one anionic surfactant. Anionic surfactants are surface-active agents with exclusively anionic charges (neutralized by a corresponding counter cation). Examples of anionic surfactants are fatty acids, alkyl sulphates, alkyl ether sulphates and ether carboxylic acids with 12 to 20 C atoms in the alkyl group and up to 16 glycol ether groups in the molecule.

The anionic surfactants are used in a total quantity of about 0.1 to about 45 wt. %, preferably about 1 to about 30 wt. % and most preferably about 1 to about 15 wt. %—based on the total weight of the respective agent.

They may also contain other active substances, auxiliaries and additives, such as solvents, fatty components such as $C_5$-$C_{30}$ fatty alcohols, $C_5$-$C_{30}$ fatty acid triglycerides, $C_8$-$C_{30}$ fatty acid monoglycerides, $C_8$-$C_{30}$ fatty acid diglycerides and/or hydrocarbons; structural agents such as glucose, maleic acid and lactic acid; hair conditioning compounds such as phospholipids, for example lecithin and cephalins; perfume oils, dimethylisosorbide and cyclodextrins; fiber structure-improving active substances, in particular mono-, di- and oligosaccharides such as glucose, galactose, fructose, fructose and lactose; dyes for coloring the composition; anti-dandruff active substances such as Piroctone Olamine, Zinc Omadine and Climbazol; amino acids and oligopeptides; protein hydrolysates on animal and/or vegetable basis, as well as in the form of their fatty acid condensation products or optionally anionic or cationically modified derivatives; vegetable oils; sunscreens and UV-blockers; active ingredients such as panthenol, pantothenic acid, pantolactone, allantoin, pyrrolidinonecarboxylic acids and their salts, and bisabolol; polyphenols, in particular hydroxycinnamic acids, 6,7-dihydroxycumarine, hydroxybenzoic acids, catechine, tannine, leukoanthocyanidine, anthocyanidine, flavanone, flavone and flavonols; ceramides or pseudoceramides; vitamins, provitamins and vitamin precursors; plant extracts; fats and waxes such as fatty alcohols, beeswax, montan wax and paraffins; swelling and penetrating substances such as glycerol, propylene glycol monoethyl ether, carbonates, hydrogen carbonates, guanidines, ureas and primary, secondary and tertiary phosphates; opacifiers such as latex, styrene/PVP and styrene/acrylamide copolymers; pearlescent agents such as ethylene glycol mono- and distearate and PEG-3 distearate; and blowing agents such as propane-butane mixtures, $N_2O$, dimethyl ether, $CO_2$ and air.

The selection of these other substances will be made by the specialist according to the desired properties of the agents. About other optional components and the quantities of these components used, explicit reference is made to the relevant manuals known to the specialist. The additional active ingredients and auxiliary substances are preferably used in the preparations as contemplated herein in quantities of about 0.0001 to about 25% by weight each, about 0.0005 to about 15% by weight, based on the total weight of the respective agent.

Process for Dyeing Keratin Materials

In the procedure as contemplated herein, agents (a) and (b) are applied to the keratinous materials, to human hair. Thus, agents (a) and (b) are the ready-to-use agents. The agents (a) and (b) are different.

In principle, agents (a) and (b) can be applied simultaneously or successively, whereby successive application is preferred.

The best results were obtained when agent (a) was first applied to the keratin materials in a first step and then agent (b) was applied in a subsequent step.

Quite particularly preferred, therefore, is a process for treating keratinous material, for coloring keratinous material, in particular human hair, comprising the following steps in the order indicated:

in a first step, applying an agent (a) to the keratinous material, the agent comprising (a):

(a1) at least one organic silicon compound selected from the group of silanes having one, two or three silicon atoms, and (a2) at least one colorant compound selected from the group of pigments and/or direct dyes, and in a second step, applying an agent (b) to the keratinous material, the agent comprising (b): (b1) at least one film-forming polymer.

The agents (a) and (b) are particularly preferably applied within one and the same dyeing process, which means that there is a period of a maximum of several hours between the application of agents (a) and (b).

In a further preferred embodiment, a method as contemplated herein is exemplified in that first the agent (a) is applied, and then the agent (b) is applied, the time between the application of the agents (a) and (b) being at most 24 hours, preferably at most 12 hours and particularly preferably at most 6 hours.

A distinguishing feature of the agent (a) is its content of at least one reactive organic silicon compound (a1). The reactive organic silicon compound(s) (a1) undergoes an oligomerization or polymerization reaction and thus functionalizes the hair surface as soon as it meets it. In this way, a first, film is formed. The coloring compounds (a2) are incorporated into the film so that it is colored. In the second step of the process, a second, polymer-containing agent (b) is now applied to the hair. During the application of agent (b), the film-forming polymers interact with the silane film and are thus bound to the keratin materials. Here, the technical application properties of the resulting dyeing can be further improved by selecting the optimum process conditions.

In the context of a further form of execution, a procedure comprising the following steps in the order indicated is particularly preferred.

(1) Application of agent (a) on the keratinous material,
(2) Allow the agent (a) to act for a period of 10 seconds to 10 minutes, preferably from about 10 seconds to about 5 minutes,
(3) if necessary, rinse the keratinous material with water,
(4) Application of agent (b) on the keratinous material,
(5) Allow the agent (b) to act for a period of about 30 seconds to about 30 minutes, preferably from about 30 seconds to about 10 minutes, and
(6) Rinse the keratinous material with water.

The rinsing of the keratinous material with water in steps (3) and (6) of the process is understood, as contemplated herein, to mean that only water is used for the rinsing process, without any other agents other than agents (a) and (b).

In a first step (1), agent (a) is applied to the keratin materials, especially human hair.

After application, the agent (a) can act on the keratin materials. In this context, application times from about 10 seconds to about 10 minutes, preferably from about 20 seconds to about 5 minutes and especially preferably from about 30 seconds to about 2 minutes on the hair have proven to be particularly beneficial.

In a preferred embodiment of the method as contemplated herein, the agent (a) can now be rinsed from the keratin materials before the agent (b) is applied to the hair in the subsequent step.

Dyeing's with also good wash fastness were obtained when agent (b) was applied to the keratin materials which were still exposed to agent (a).

In step (4), agent (b) is now applied to the keratin materials. After application, let the agent (b) act on the hair.

The process as contemplated herein allows the production of dyeing's with particularly good intensity and wash fastness even with a short exposure time of agent (b). Application times from about 10 seconds to about 10 minutes, preferably from about 20 seconds to about 5 minutes and most preferably from about 30 seconds to about 3 minutes on the hair have proven to be particularly beneficial.

In step (6), agent (b) (and any remaining agent (a)) is rinsed out of the keratin material with water.

In the context of a further form of execution, a procedure comprising the following steps in the order indicated is particularly preferred.

(1) Application of agent (a) on the keratinous material,
(2) Allow the agent (a) to act for a period of about 10 seconds to about 10 minutes, preferably from about 10 seconds to about 5 minutes,
(3) if necessary, rinse the keratinous material with water,
(4) Application of agent (b) on the keratinous material,
(5) Allow the agent (b) to act for a period of about 30 seconds to about 30 minutes, preferably from about 30 seconds to about 10 minutes, and
(6) Rinse the keratinous material with water.

In this embodiment, the sequence of steps (1) to (6) preferably takes place within 24 hours.

The agent (a) contains with the organic silicon compound(s) a class of highly reactive compounds which can undergo hydrolysis or oligomerization and/or polymerization when used. Due to their high reactivity, these organic silicon compounds form a film on the keratin material.

To avoid premature oligomerization or polymerization, it is of considerable advantage to the user to prepare the ready-to-use agent (a) only shortly before application.

In yet another embodiment, preferred is a method comprising the following steps in the order indicated.

(1) preparing an agent (a) by mixing a first agent (a') and a second agent (a"), wherein
    the first agent (a') comprises at least one organic silicon compound (a1) from the group of silanes having one, two or three silicon atoms, and
    the second agent (a") comprises at least one colorant compound (a2) selected from the group of pigments and/or direct dyes,
(2) Application of agent (a) on the keratinous material,
(3) Allow the agent (a) to act for a period of about 10 seconds to about 10 minutes, preferably from about 10 seconds to about 5 minutes,
(4) if necessary, rinse the keratinous material with water,
(4) Application of agent (b) on the keratinous material,
(5) Allowing the agent (b) to act for a period of about 30 seconds to about 30 minutes, preferably from about 30 seconds to about 10 minutes,
(6) if necessary, rinse the keratinous material with water.

To be able to provide a formulation that is as stable as possible in storage, the agent (a') itself is preferably formulated to be low in water or water-free.

In a preferred embodiment, a multicomponent packaging unit (kit-of-parts) as contemplated herein is exemplified in that the agent (a')—based on the total weight of the agent (a')—contains a water content of from about 0.001 to about 10.0% by weight, preferably from about 0.5 to about 9.0% by weight, more preferably from about 1.0 to about 8.0% by weight and very particularly preferably from about 1.5 to about 7.0% by weight.

The agent (a") contains water. In a preferred embodiment, a multicomponent packaging unit (kit-of-parts) as contemplated herein is exemplified in that the agent (a")—based on the total weight of the agent (a2)—has a water content of from about 15 to about 100% by weight, preferably from about 35 to about 100% by weight, more preferably from about 55 to about 100% by weight, still more preferably from about 65 to about 100% by weight and very particularly preferably from about 75 to about 100% by weight.

Within this embodiment, the ready-to-use agent (a) is now prepared by mixing agents (a') and (a").

For example, the user may first stir or shake the agent (a') containing the organic silicon compound(s) (a1) with the aqueous dye-containing agent (a"). The user can now apply this mixture of (a') and (a") to the keratin materials—either immediately after its preparation or after a short reaction time of 10 seconds to 20 minutes. Afterwards, the user can apply agent (b) as described above.

The optionally included silicone polymer (a3) can now be incorporated into the agent (a') or into the agent (a"). Preferably, silicone polymer (a3) is incorporated into the agent (a").

In yet another embodiment, preferred is a method comprising the following steps in the order indicated.

(1) preparing an agent (a) by mixing a first agent (a') and a second agent (a"), wherein
  the first agent (a') comprises at least one organic silicon compound (a1) from the group of silanes having one, two or three silicon atoms and furthermore at least one silicone polymer (a3), and
  the second agent (a") comprises at least one colorant compound (a2) selected from the group of pigments and/or direct dyes,
(2) Application of agent (a) on the keratinous material,
(3) Allow the agent (a) to act for a period of 10 seconds to 10 minutes, preferably from 10 seconds to 5 minutes,
(4) if necessary, rinse the keratinous material with water,
(4) Application of agent (b) on the keratinous material,
(5) Allowing the agent (b) to act for a period of 30 seconds to 30 minutes, preferably from 30 seconds to 10 minutes,
(6) if necessary, rinse the keratinous material with water.

In the context of a further embodiment, particularly preferred is a method comprising the following steps in the order indicated.

(1) preparing an agent (a) by mixing a first agent (a') and a second agent (a"), wherein
  the first agent (a') comprises at least one organic silicon compound (a1) from the group of silanes having one, two or three silicon atoms, and
  the second agent (a") comprises at least one colorant compound (a2) selected from the group of pigments and/or direct dyes and furthermore at least one silicone polymer (a3),
(2) Application of agent (a) on the keratinous material,
(3) Allow the agent (a) to act for a period of about 10 seconds to about 10 minutes, preferably from about 10 seconds to about 5 minutes,
(4) if necessary, rinse the keratinous material with water,
(4) Application of agent (b) on the keratinous material,
(5) Allowing the agent (b) to act for a period of about 30 seconds to about 30 minutes, preferably from about 30 seconds to about 10 minutes,
(6) if necessary, rinse the keratinous material with water.

In a further preferred embodiment, a process as contemplated herein can also be exemplified in that the silicone polymer(s) (a3) is/are provided in a third separately prepared agent (a'").

Preferred in the context of this further embodiment is a method comprising the following steps in the order indicated.

(1) preparing an agent (a) by mixing a first agent (a') and a second agent (a") and a third agent (a"), wherein
  the first agent (a') comprises at least one organic silicon compound (a1) from the group of silanes having one, two or three silicon atoms, and
  the second agent (a") comprises at least one colorant compound (a2) selected from the group of pigments and/or direct dyes, and
  the third agent (a") comprises at least one silicone polymer (a3),
(2) Application of agent (a) on the keratinous material,
(3) Allow the agent (a) to act for a period of about 10 seconds to about 10 minutes, preferably from about 10 seconds to about 5 minutes,
(4) if necessary, rinse the keratinous material with water,
(4) Application of agent (b) on the keratinous material,
(5) Allowing the agent (b) to act for a period of about 30 seconds to about 30 minutes, preferably from about 30 seconds to about 10 minutes,
(6) if necessary, rinse the keratinous material with water.

Multi-Component Packaging Unit (Kit-of-Parts)

To increase user comfort, the user is preferably provided with all required resources in the form of a multi-component packaging unit (kit-of-parts).

A second subject matter of the present disclosure is therefore a multi-component packaging unit (kit-of-parts) for coloring keratinic material, comprehensively packaged separately from one another.

a first container comprising an agent (a'), wherein the agent comprises (a'):
(a1) at least one organic silicon compound selected from the group of silanes having one, two or three silicon atoms, and
a second container comprising an agent (a"), wherein the agent comprises (a"):
(a2) at least one colorant compound selected from the group of pigments and/or direct dyes, and
a third container containing an agent (b), wherein the agent contains (b):
(b1) at least one film-forming polymer, wherein the components (a1), (a2) and (b1) were disclosed in detail in the description of the first subject matter of the invention.

The organic silicon compounds (a1) from the group of silanes with one, two or three silicon atoms contained in agent (a) of the kit correspond to the organic silicon compounds that were also used in agent (a) of the previously described process.

The colorant compound (a2) from the group of pigments and/or direct dyes contained in the agent (a") of the kit corresponds to the colorant compounds also used in agent (a) of the previously described process.

The film-forming polymers (b1) contained in agent (b) of the kit correspond to the film-forming polymers that were also used in agent (b) of the previously described process.

In this context, it is again possible to use the optionally included silicone polymer (a3)

To be made up in the agent (a'), in the agent (a") or in a further agent (a'").

In the context of a further embodiment, a multi-component packaging unit (kit-of-parts) for coloring keratinic material is preferably packaged separately from one another.

a first container comprising an agent (a'), wherein the agent comprises (a'):
at least one organic silicon compound (a1) from the group of silanes with one, two or three silicon atoms and furthermore at least one silicone polymer (a3), and
a second container comprising an agent (a"), wherein the agent comprises (a"):
(a2) at least one colorant compound selected from the group of pigments and/or direct dyes, and a third container containing an agent (b), wherein the agent contains (b):

(b1) at least one film-forming polymer, wherein the components (a1), (a2), (3) and (b1) were disclosed in detail in the description of the first subject matter of the invention.

In the context of a further embodiment, a multi-component packaging unit (kit-of-parts) for coloring keratinic material is preferably packaged separately from one another.

a first container comprising an agent (a'), wherein the agent comprises (a'):

at least one organic silicon compound (a1) from the group of silanes with one, two or three silicon atoms and furthermore at least one silicone polymer (a3), and a second container comprising an agent (a''), wherein the agent comprises (a''):

(a2) at least one colorant compound selected from the group of pigments and/or direct dyes, and a third container containing an agent (am), wherein the agent (a''') is a water-containing cosmetic carrier a third container containing an agent (b), wherein the agent contains (b):

(b1) at least one film-forming polymer, wherein the components (a1), (a2), (3) and (b1) were disclosed in detail in the description of the first subject matter of the invention.

In this embodiment, agents (a') and (a'') have a low water content. To prepare the ready-to-use agent (a), agents (a'), (a'') and (a') are mixed. In this case, the agent (a'''') represents a water-containing cosmetic carrier.

In the context of a further embodiment, a multi-component packaging unit (kit-of-parts) for coloring keratinic material is preferably packaged separately from one another.

a first container comprising an agent (a'), wherein the agent comprises (a'):

at least one organic silicon compound (a1) from the group of silanes having one, two or three silicon atoms, and a second container comprising an agent (a''), wherein the agent comprises (a''):

(a2) at least one colorant compound selected from the group of pigments and/or direct dyes, and furthermore at least one silicone polymer (a3), and a third container containing an agent (b), wherein the agent contains (b):

(b1) at least one film-forming polymer, wherein the components (a1), (a2), (a3) and (b1) were disclosed in detail in the description of the first subject matter of the invention.

In the context of a further embodiment, a multi-component packaging unit (kit-of-parts) for coloring keratinic material is preferably packaged separately from one another.

a first container comprising an agent (a'), wherein the agent comprises (a'):

at least one organic silicon compound (a1) from the group of silanes having one, two or three silicon atoms, and a second container comprising an agent (a''), wherein the agent comprises (a''):

(a2) at least one colorant compound selected from the group of pigments and/or direct dyes, and a third container comprising an agent (a'''), said agent comprising (a'''):

at least one silicone polymer (a3), and fourth container containing agent (b), wherein the agent contains (b):

(b1) at least one film-forming polymer, wherein the components (a1), (a2), (a3) and (b1) were disclosed in detail in the description of the first subject matter of the invention.

With respect to the other preferred embodiments of the multi-component packaging unit as contemplated herein, the same applies mutatis mutandis to the procedure as contemplated herein.

EXAMPLES

Example 1

The following formulations have been produced (unless otherwise indicated, all figures are in % by weight)

| Agent (a') | in wt.. % |
|---|---|
| (3-Aminopropyl)triethoxysilane (a1) | 20.0 |
| Methyltrimethoxysilane (a1) | 70.0 |
| Water | ad 100 |

| Agent (a'') | in wt.. % |
|---|---|
| Phthalocyanine blue pigment CI 74160 (a3) | 5.0 |
| PEG-12 Dimethicone | 5.0 |
| Hydroxyethyl cellulose | 1.0 |
| Water | ad 100 |

The ready-to-use agent (a) was prepared by mixing 5.0 g of agent (a') and 20.0 g of agent (a''). The pH value of the agent (a) was adjusted to a value of 10.5 by adding ammonia or lactic acid. Then the agent (a) could stand for about 5 minutes.

| Agent (b) | in wt.. % |
|---|---|
| Ethylene/Sodium Acrylate Copolymer (b1) 25% solution | 40.0 |
| Water | ad 100 |

The agent (a) was massaged into one strand of hair at a time (Kerling, Euronatural hair white), and left to act for 1 minute. The agent (a) was then rinsed with water.

Subsequently, agent (b) was applied to the hair strand, left to act for 1 minute and then also rinsed with water.

On the hair strand was obtained intense blue coloration with good fastness to washing and particularly good fastness to rubbing.

Example 2

The following formulations have been produced (unless otherwise indicated, all figures are in % by weight)

Agent (a')

| Agent (a') | in wt.. % |
|---|---|
| (3-Aminopropyl)triethoxysilane (a1) | 20.0 |
| Methyltrimethoxysilane (a1) | 70.0 |
| Water | ad 100 |

Agent (a")

| Agent (a") | in wt.. % |
|---|---|
| Pigment permanent red R CI 12085 1-[(2-chloro-4-nitrophenyl)azo]-2-naphthol (a3) | 60.0 |
| PEG-12 Dimethicone | 40.0 |

Agent (a"') (cosmetic carrier)

| Agent (a"') | in wt.. % |
|---|---|
| Hydroxyethyl cellulose | 1.0 |
| Water | ad 100 |

The ready-to-use agent (a) was prepared by mixing 5.0 g of agent (a') and 5.0 g of agent (a") and 20.0 g of agent (a"). The pH value of the agent (a) was adjusted to a value of 10.5 by adding ammonia or lactic acid. Then the agent (a) could stand for about 5 minutes.

Agent (b)

| Agent (b) | in wt.. % |
|---|---|
| Ethylene/Sodium Acrylate Copolymer (b1) 25% solution | 40.0 |
| Water | ad 100 |

The agent (a) was massaged into one strand of hair at a time (Kerling, Euronatural hair white), and left to act for 1 minute. The agent (a) was then rinsed with water.

Subsequently, agent (b) was applied to the hair strand, left to act for 1 minute and then also rinsed with water.

An intense red coloration with good wash fastness particularly good rub fastness was obtained.

Example 3

The following formulations have been produced (unless otherwise indicated, all figures are in % by weight)

Agent (a')

| Agent (a') | in wt.. % |
|---|---|
| (3-Aminopropyl)triethoxysilane (a1) | 20.0 |
| Methyltrimethoxysilane (a1) | 70.0 |
| Water | ad 100 |

Agent (a")

| Agent (a") | in wt.. % |
|---|---|
| Pigment permanent red R CI 12085 1-[(2-chloro-4-nitrophenyl)azo]-2-naphthol (a3) | 100.0 |

Agent (a"')

| Agent (a"') | in wt.. % |
|---|---|
| Hydroxyethyl cellulose | 1.0 |
| PEG-12 Dimethicone | 40.0 |
| Water | ad 100 |

The ready-to-use agent (a) was prepared by mixing 5.0 g of agent (a') and 5.0 g of agent (a") and 20.0 g of agent (a"). The pH value of the agent (a) was adjusted to a value of 10.5 by adding ammonia or lactic acid. Then the agent (a) could stand for about 5 minutes.

Agent (b)

| Agent (b) | in wt.. % |
|---|---|
| Ethylene/Sodium Acrylate Copolymer (b1) 25% solution | 40.0 |
| Water | ad 100 |

The agent (a) was massaged into one strand of hair at a time (Kerling, Euronatural hair white), and left to act for 1 minute. The agent (a) was then rinsed with water.

Subsequently, agent (b) was applied to the hair strand, left to act for 1 minute and then also rinsed with water.

An intense red coloration with good wash fastness particularly good rub fastness was obtained.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. Process for dyeing keratinous material comprising the following steps:

in a first step, applying an agent (a) to the keratinous material, wherein the agent (a) comprises:

(a1) from about 0.1 to about 10% by weight, based on a total weight of the agent (a), of at least one first organic silicone compound selected from the group of (3-aminopropyl)trimethoxysilane, (3-aminopropyl)triethoxysilane, (2-aminoethyl)trimethoxysilane, (2-aminoethyl)triethoxysilane, (3-dimethylaminopropyl) trimethoxysilane, (3-dimethylaminopropyl)

triethoxysilane (2-dimethylaminoethyl) trimethoxysilane and (2-dimethylaminoethyl) triethoxysilane, and (a1) from about 2.0 to about 15.0% by weight, based on a total weight of the agent (a), of at least one second organic silicone compound selected from the group of methyltrimethoxysilane, methyltriethoxysilane, ethyltrimethoxysilane, ethyltriethoxysilane, octyltrimethoxysilane, octyltriethoxysilane, dodecyltrimethoxysilane and dodecyltriethoxysilane, and (a2) from about 0.1 to about 10% by weight, based on a total weight of the agent (a), of at least pigment selected from:

an organic pigment selected from the group of carmine, quinacridone, phthalocyanine, sorghum, blue pigments having the color index numbers C1 42090, CI 69800, CI 69825, CI 73000, CI 74100, CI 74160, yellow pigments having the color index numbers CI 11680, CI 11710, CI 15985, CI 19140, CI 20040, CI 21100, CI 21108, CI 47000, CI 47005, green pigments with Color Index numbers CI 61565, CI 61570, CI 74260, orange pigments with Color Index numbers CI 11725, CI 15510, CI 45370, CI 71105, red pigments with the Color Index numbers CI 12085, CI 12120, CI 12370, CI 12420, CI 12490, CI 14700, CI 15525, CI 15580, CI 15620, CI 15630, CI 15800, CI 15850, CI 15865, CI 15880, CI 17200, CI 26100, CI 45380, CI 45410, CI 58000, CI 73360, CI 73915 and/or CI 75470; or an inorganic colored pigment selected from the group of metal oxides, metal hydroxides, metal oxide hydrates, or colored pigments based on mica or mica coated with at least one metal oxide and/or metal oxychloride, and in a second step, applying an agent (b) to the keratinous material, wherein the agent (b) comprises:

(b1) from about 5 to about 14% by weight, based on a total weight of the agent (b), of at least one film-forming polymer selected from the group of acrylic acid homopolymers and copolymers, methacrylic acid homopolymers and copolymers, acrylic acid ester homopolymers and copolymers, methacrylic acid ester homopolymers and copolymers, homopolymers and copolymers of acrylic acid amides, homopolymers and copolymers of methacrylic acid amides, homopolymers and copolymers of ethylene, and/or homopolymers and copolymers of propylene.

2. The process according to claim 1, wherein the agent (a) further comprises at least one organic silicon compound of formula (II),

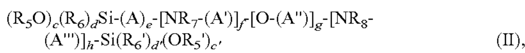

$$(R_5O)_c(R_6)_dSi\text{-}(A)_e\text{-}[NR_7\text{-}(A')]_f\text{-}[O\text{-}(A'')]_g\text{-}[NR_8\text{-}(A''')]_h\text{-}Si(R_6')_{d'}(OR_5')_{c'} \quad \text{(II)},$$

where e and f both stand for the number 1, g and h both stand for 0,

A and A' independently represent a linear, divalent C1-C6 alkylene group and

R7 represents a hydrogen atom, a methyl group, a 2-hydroxyethyl group, a 2-alkenyl group, a 2-aminoethyl group or a group of formula (III).

3. The process according to claim 1, wherein the agent (a) further comprises at least one organic silicon compound selected from the group of 3-(trimethoxysilyl)-N-[3-(trimethoxysilyl)propyl]-1-propanamine 3-(Triethoxysilyl)-N-[3-(triethoxysilyl)propyl]-1-propanamine N-methyl-3-(trimethoxysilyl)-N-[3-(trimethoxysilyl)propyl]-1-propanamine N-Methyl-3-(triethoxysilyl)-N-[3-(triethoxysilyl)propyl]-1-propanamine 2-[Bis[3-(trimethoxysilyl)propyl]amino]-ethanol 2-[bis[3-(triethoxysilyl)propyl]amino]ethanol 3-(Trimethoxysilyl)-N,N-bis[3-(trimethoxysilyl)propyl]-1-propanamine 3-(Triethoxysilyl)-N,N-bis[3-(triethoxysilyl)propyl]-1-propanamine N1,N1-bis[3-(trimethoxysilyl)propyl]-1,2-ethanediamine, N1,N1-bis[3-(triethoxysilyl)propyl]-1,2-ethanediamine, N,N-bis[3-(trimethoxysilyl)propyl]-2-propen-1-amine and/or N,N-bis[3-(triethoxysilyl)propyl]-2-propen-1-amine.

4. The method according to claim 1, wherein the agent (a) further comprises:

(a3) at least one alkoxy-modified and/or amino-modified silicone polymer.

5. The method according to claim 1, wherein the agent (a) further comprises:

(a3) at least one silicone polymer comprising at least one structural unit of formula (S-I)

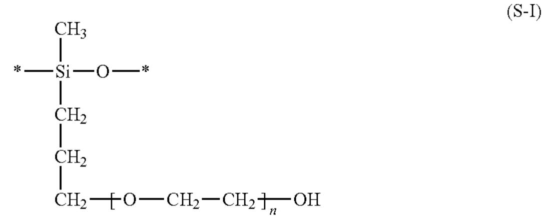

wherein n is an integer from about 2 to about 20.

6. The method according to claim 1, wherein the agent (a) further comprises:

(a3) at least one silicone polymer comprising at least one structural unit of the formula (S-XIII)

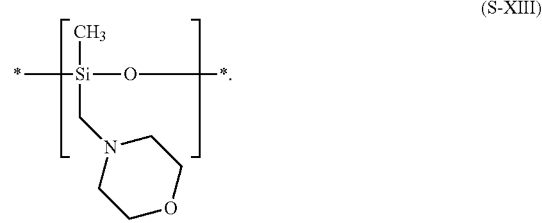

7. The process according to claim 1, wherein first the agent (a) is applied, then the agent (b) is applied, the period between the application of the agents (a) and (b) being at most about 24 hours.

8. The process according to claim 1, comprising the following steps in the order indicated (1) applying agent (a) on the keratinous material, (2) allowing the agent (a) to act for a period of from about 10 seconds to about 10 minutes, (3) optionally, rinsing the keratinous material with water, (4) applying agent (b) on the keratinous material, (5) allowing the agent (b) to act for a period of from about 30 seconds to about 30 minutes, (6) optionally, rinsing the keratinous material with water.

9. The process according to claim 1, wherein the agent (a) has an alkaline pH.

10. The process according to claim 9, wherein the agent (a) comprises:

(a1) at least one organic silicon compound of the formula (I) selected from (3-aminopropyl)triethoxysilane or (3-aminopropyl)trimethoxysilane, and at least one organic silicon compound of the formula (IV) selected from methyltrimethoxysilane, methyltriethoxysilane, ethyltrimethoxysilane, or ethyltriethoxysilane.

11. The process according to claim 10, wherein the agent (a) comprises:

(a1) (3-aminopropyl)triethoxysilane and methyltrimethoxysilane.

12. The process according to claim 11, wherein the agent (b) comprises:

(b1) acrylates/octylacrylamide copolymer.

13. The process according to claim 1, wherein:

the at least one first organic silicone compound is present in an amount of from about 0.5 wt % to about 5 wt %, based on a total weight of the agent (a);

the at least one pigment is selected from the group of metal oxides, metal hydroxides, metal oxide hydrates, or colored pigments based on mica or mica coated with at least one metal oxide and/or metal oxychloride; and the at least one film forming polymer is selected from the group of acrylic acid homopolymers and copolymers, acrylic acid ester homopolymers and copolymers, homopolymers and copolymers of acrylic acid amides, and/or homopolymers and copolymers of ethylene.

14. The process according to claim 13, wherein:

the at least one pigment is a colored pigment based on mica or mica coated with at least one metal oxide and/or metal oxychloride; and the at least one film-forming polymer is selected from the group of acrylic acid copolymers, acrylic acid ester copolymers, acrylic acid amide copolymers, and/or ethylene copolymers.

15. The process according to claim 14, wherein:

the at least one pigment is a colored pigment based on mica coated with at least one metal oxide.

* * * * *